United States Patent
Lee

(10) Patent No.: US 12,212,944 B2
(45) Date of Patent: Jan. 28, 2025

(54) METHOD FOR CONTROLLING AMBIENT SOUND AND ELECTRONIC DEVICE FOR THE SAME

(71) Applicant: SAMSUNG ELECTRONICS CO., LTD., Suwon-si (KR)

(72) Inventor: Chulmin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 293 days.

(21) Appl. No.: 17/859,726

(22) Filed: Jul. 7, 2022

(65) Prior Publication Data

US 2023/0019110 A1  Jan. 19, 2023

Related U.S. Application Data

(63) Continuation of application No. PCT/KR2022/009656, filed on Jul. 5, 2022.

(30) Foreign Application Priority Data

Jul. 8, 2021 (KR) .................. 10-2021-0089747

(51) Int. Cl.
*H04R 5/04* (2006.01)
*G10L 15/08* (2006.01)
(Continued)

(52) U.S. Cl.
CPC .............. *H04R 5/04* (2013.01); *G10L 15/08* (2013.01); *G10L 25/78* (2013.01); *H04R 5/033* (2013.01);
(Continued)

(58) Field of Classification Search
CPC ...... H04R 5/04; H04R 5/033; H04R 2420/07; H04R 2430/01; G10L 15/08; G10L 25/78;
(Continued)

(56) References Cited

U.S. PATENT DOCUMENTS

| | | |
|---|---|---|
| 9,398,367 B1 | 7/2016 | Scott et al. |
| 9,716,939 B2 | 7/2017 | Di Censo et al. |

(Continued)

FOREIGN PATENT DOCUMENTS

| | | |
|---|---|---|
| CN | 110148420 A | 8/2019 |
| CN | 111464905 A | 7/2020 |

(Continued)

OTHER PUBLICATIONS

International Search Report with English Translation for International Application No. PCT/KR2022/009656; International Filing Date Jul. 5, 2022; Date of Mailing Oct. 21, 2022; 10 pages.

(Continued)

*Primary Examiner* — Jason R Kurr
(74) *Attorney, Agent, or Firm* — CANTOR COLBURN LLP

(57) ABSTRACT

An electronic device includes a speaker, a sensor, a communication circuit, a processor, and a memory to store instructions. The instructions, when executed by the processor, cause a wireless audio device to, while outputting a signal for reducing an external sound through the speaker, identify, using the communication circuit, an external electronic device, identify, using the sensor, a conversation responsive to a location of the external electronic device satisfying a specified condition, responsive to identifying the conversation, stop an output of the signal for reducing the external sound for a first period of time, and responsive to identifying a specified keyword included in the conversation, prolong stopping the output of the signal for reducing the external sound for a second period of time.

20 Claims, 16 Drawing Sheets

(51) Int. Cl.
*G10L 25/78* (2013.01)
*H04R 5/033* (2006.01)

(52) U.S. Cl.
CPC .... *G10L 2015/088* (2013.01); *H04R 2420/07* (2013.01); *H04R 2430/01* (2013.01)

(58) Field of Classification Search
CPC ............ G10L 2015/088; G10K 11/178; G10K 11/17827; G10K 11/17837; G10K 11/17885; G10K 2210/1081
See application file for complete search history.

(56) References Cited

U.S. PATENT DOCUMENTS

| | | | |
|---|---|---|---|
| 9,961,435 | B1 | 5/2018 | Goyal et al. |
| 10,361,673 | B1 | 7/2019 | Matsukawa |
| 10,489,109 | B2 | 11/2019 | Baek et al. |
| 10,666,215 | B2 | 5/2020 | Matsukawa |
| 10,678,495 | B2 | 6/2020 | Kielak |
| 10,681,453 | B1 | 6/2020 | Meiyappan et al. |
| 10,832,674 | B2 | 11/2020 | Jaygarl et al. |
| 11,050,399 | B2 | 6/2021 | Matsukawa |
| 11,276,384 | B2 | 3/2022 | Woodruff et al. |
| 2015/0170645 | A1* | 6/2015 | Di Censo ......... G10K 11/17821 704/275 |
| 2017/0235825 | A1 | 8/2017 | Gordon |
| 2018/0336901 | A1 | 11/2018 | Masaki et al. |
| 2020/0051554 | A1 | 2/2020 | Kim et al. |
| 2020/0135163 | A1* | 4/2020 | Lovitt .............. G10K 11/17837 |
| 2020/0329297 | A1* | 10/2020 | Dutt ....................... G10L 15/187 |
| 2020/0396533 | A1 | 12/2020 | Meiyappan et al. |
| 2021/0295838 | A1 | 9/2021 | Kwon et al. |
| 2021/0327424 | A1 | 10/2021 | Lee |
| 2021/0385571 | A1 | 12/2021 | Meiyappan et al. |
| 2022/0020387 | A1* | 1/2022 | Paquier ............ G10K 11/17837 |
| 2022/0036882 | A1 | 2/2022 | Ahn et al. |
| 2023/0353928 | A1 | 11/2023 | Meiyappan et al. |

FOREIGN PATENT DOCUMENTS

| | | |
|---|---|---|
| CN | 111741396 A | 10/2020 |
| JP | 6600634 B2 | 10/2019 |
| KR | 20170016760 A | 2/2017 |
| KR | 20170076181 A | 7/2017 |
| KR | 20180084392 A | 7/2018 |
| KR | 20190021143 A | 3/2019 |
| KR | 20200013173 A | 2/2020 |
| KR | 20200027753 A | 3/2020 |
| KR | 20200034430 A | 3/2020 |
| KR | 20200113058 A | 10/2020 |
| KR | 102316537 B1 | 10/2021 |

OTHER PUBLICATIONS

Extended European Search Report corresponding to Application No. 22837928.5-1207; Dated Sep. 12, 2024.

* cited by examiner

METHOD FOR CONTROLLING AMBIENT SOUND AND ELECTRONIC DEVICE FOR THE SAME

TECHNICAL FIELD

Various embodiments disclosed herein relate to a method for controlling ambient sound and an electronic device for the same.

BACKGROUND ART

Wireless audio devices, such as earbuds, have been extensively used. The wireless audio device may be wirelessly connected with an electronic device, such as a cellular phone, to output audio data received from the cellular phone. The wireless audio device may be connected with the electronic device wirelessly, such that the convenience of a user is improved. The improvement in the convenience of the user may increase a time that the user uses the wireless audio device.

The wireless audio device may have various technologies of canceling noise. For example, the wireless audio device may obtain ambient noise through a microphone connected with a noise cancellation circuit and may output an anti-noise signal having an inverse phase to the obtained noise. The user may hear both the ambient noise and the inverse noise to obtain an effect of canceling the noise.

The wireless audio device may have a technology for hearing various ambient noises. For example, the wireless audio device may output ambient noise, which is received through the microphone, in real time. Accordingly, the user may hear the ambient noise.

Disclosure

Technical Problem

When the wireless audio device activates an active noise cancellation (ANC) function or deactivates a function of hearing an ambient sound, the user may not hear an external sound.

Technical Solution

According to an embodiment of the disclosure, an electronic device may include a speaker, a sensor, a communication circuit, a processor, and a memory to store instructions. The instructions, when executed by the processor, cause a wireless audio device to, while outputting a signal for reducing an external sound through the speaker, identify, using the communication circuit, an external electronic device, identify, using the sensor, a conversation responsive to a location of the external electronic device satisfying a specified condition, responsive to identifying the conversation, stop an output of the signal for reducing the external sound for a first period of time, and responsive to identifying a specified keyword included in the conversation, prolong stopping the output of the signal for reducing the external sound for a second period of time.

According to an embodiment of the disclosure, a method for operating an electronic device, the method may include, while outputting a signal for reducing an external sound through at least one speaker of the wireless audio device, identifying, using a communication circuit of the wireless audio device, an external electronic device, identifying, using a sensor of the wireless audio device, a conversation responsive to a location of the external electronic device satisfying a specified condition, responsive to identifying the conversation, stopping an output of the signal for reducing the external sound for a first period of time, and responsive to identifying a specified keyword included in the conversation, prolonging stopping the output of the signal for reducing the external sound for a second period of time.

According to an embodiment of the disclosure, a method may include enabling an active noise cancellation function for a wireless audio device; determining whether an active noise cancellation function off condition is satisfied; responsive to determining that the active noise cancellation function off condition is satisfied, disabling the active noise cancellation function for a first period of time; determining whether to adjust the first period of time responsive to keyword being detected from an utterance; and responsive to determining to adjust the first period of time, continuing to disable the active noise cancellation function for a second period of time.

Advantageous Effects

According to various embodiments disclosed herein, the electronic device may deactivate the ANC function or activate the function of hearing the ambient sound, based on a surround environment.

DESCRIPTION OF DRAWINGS

In the following description made with respect to the accompanying drawings, similar components will be assigned with similar reference numerals.

MODE FOR INVENTION

Figure 1:
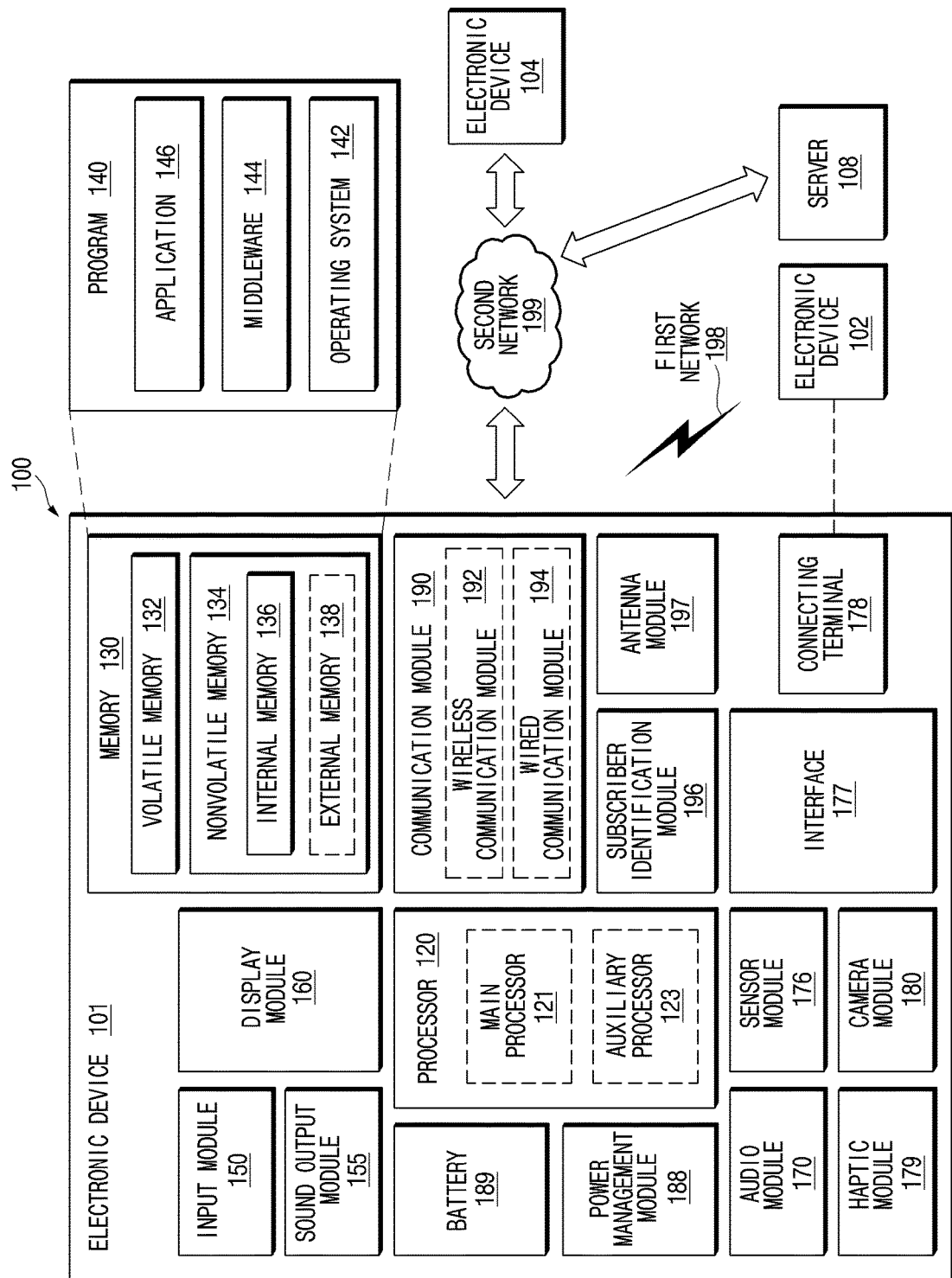
FIG. 1 is a block diagram illustrating an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
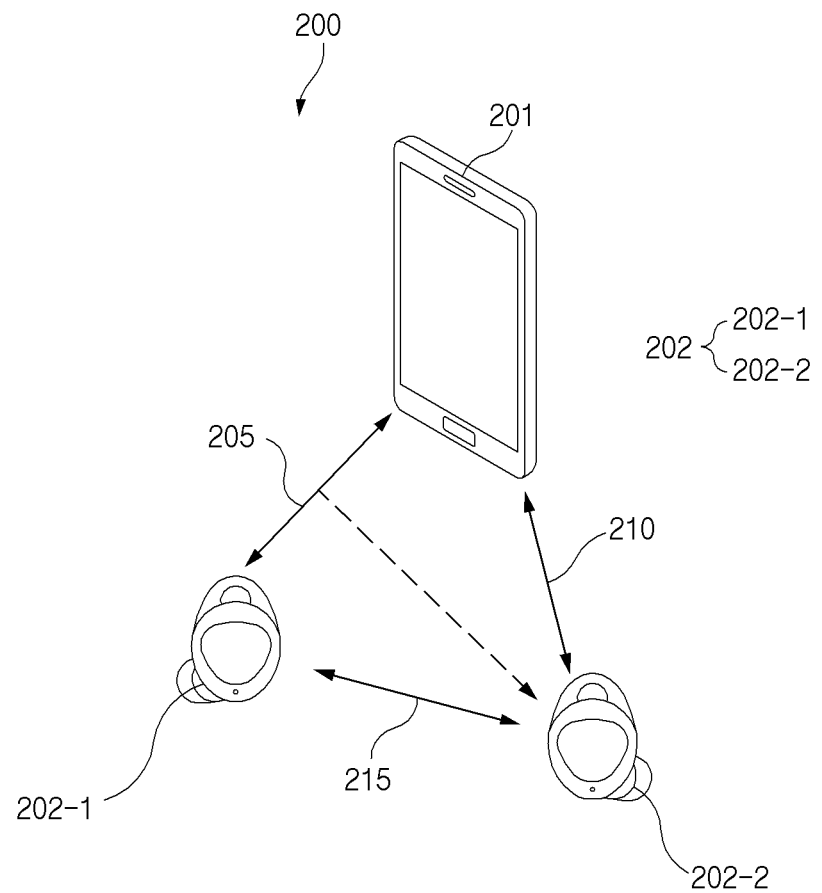
FIG. 2 illustrates a communication environment of an electronic device and a wireless audio device, according to an embodiment.

FIG. 2 illustrates a communication environment 200 of an electronic device 201 and a wireless audio device 202, according to an embodiment. [50] Referring to FIG. 2, an electronic device 201 and a wireless audio device 202 (e.g., a first wireless audio device 202-1 and/or a second wireless audio device 202-2) may at least partially include the same component or a similar component or may at least partially perform the same function or a similar function. Hereinafter, the term "wireless audio device 202" may be referred to as the first wireless audio device 202-1, the second wireless audio device 202-2, or the first and second wireless audio devices 202-1 and 202-2, unless specified otherwise. The electronic device 201 may include a user terminal, such as a smartphone, a tablet computer, a desktop computer, or a laptop computer. The wireless audio device 202 may include a wireless earphone, a headset, an earbud, or a speaker, but the disclosure is not limited thereto. The wireless audio device 202 may include various types of devices (e.g., a hearing aid, or a portable audio device) to receive an audio signal and to output the received audio signal. The term "wireless audio device" is distinguished from the electronic device 201, and the wireless audio device 202 may be referred to as an electronic device, a wireless earphone, an earbud, a true wireless stereo (TWS), or an earset.

According to an embodiment, the electronic device 201 and the wireless audio device 202 may wirelessly communicate in a short range through a Bluetooth network defined by a Bluetooth™ special interest group (SIG). According to an embodiment, the Bluetooth network may include a Bluetooth legacy network or a Bluetooth low energy (BLE) network. According to an embodiment, the electronic device 201 and the wireless audio device 202 may wirelessly communicate through one of a Bluetooth legacy network and a BLE network, or may wirelessly communicate through two networks.

According to an embodiment, the electronic device 201 may function as a primary device (e.g., a master device), and the wireless audio device 202 may function as a secondary device (e.g., a slave device). The number of devices, which function as secondary devices, is not limited to the example illustrated in FIG. 2. According to an embodiment, the function of the primary device or the secondary device may be determined through an operation that a link (e.g., 205, 210, and/or 215) is created between devices. According to another embodiment, one of the first wireless audio device 202-1 and the second wireless audio device 202-2 (e.g., the first wireless audio device 202-1) may function as the primary device, and the other one of the first wireless audio device 202-1 and the second wireless audio device 202-2 (e.g., the second wireless audio device 202-2) may function as the secondary device.

According to an embodiment, the electronic device 201 may transmit a data packet, which includes content such as a text, audio data, an image, and/or a video, to the wireless audio device 202. At least one device of wireless audio devices 202 may transmit a data packet to the electronic device 201. For example, when music is reproduced in the electronic device 201, the electronic device 201 may transmit a data packet, which includes content (e.g., music data), to the wireless audio device 202 through a link (e.g., the first link 205 and/or the second link 210) creased together with the wireless audio device 202. For example, at least one device of the wireless audio devices 202 may transmit a data packet, which includes content (e.g., audio data), to the electronic device 201, through the created link. When the electronic device 201 transmits the data packet, the electronic device 201 may be referred to as a source device, and the wireless audio device 202 may be referred to as a sink device.

The electronic device 201 may create or establish a link (e.g., the links 205, 210) with at least one device (202-1 and/or 202-2) of the wireless audio devices 202 to transmit the data packet. For example, the electronic device 201 may create the first link 205 together with the first wireless audio device 202-1 and/or the second link 210 together with the second wireless audio device 202-2, based on a Bluetooth or BLE protocol. According to an embodiment, the electronic device 201 may make communication with the first wireless audio device 202-1 through the first link 205 together with the first wireless audio device 202-1. In this case, for example, the second wireless audio device 202-2 may be configured to monitor the first link 205. For example, the second wireless audio device 202-2 may receive data, which is transmitted from the electronic device 201 through the first link 205, by monitoring the first link 205.

According to an embodiment, the second wireless audio device 202-2 may monitor the first link 205 by using information associated with the first link 205. The information associated with the first link 205 may include address information (e.g., a Bluetooth address of a primary device of the first link 205, a Bluetooth address of the electronic device 201, and/or a Bluetooth address of the first wireless audio device 202-1), clock information (e.g., a clock native (CLKN) of the primary device of the first link 205) of a piconet (e.g., a topology 200), logical transport (LT) address information (information allocated by the primary device of the first link 205), used channel map information, link key information, service discovery protocol (SDP) information (e.g., service and/or profile information associated with the first link 205) and/or supported feature information.

Figure 3:
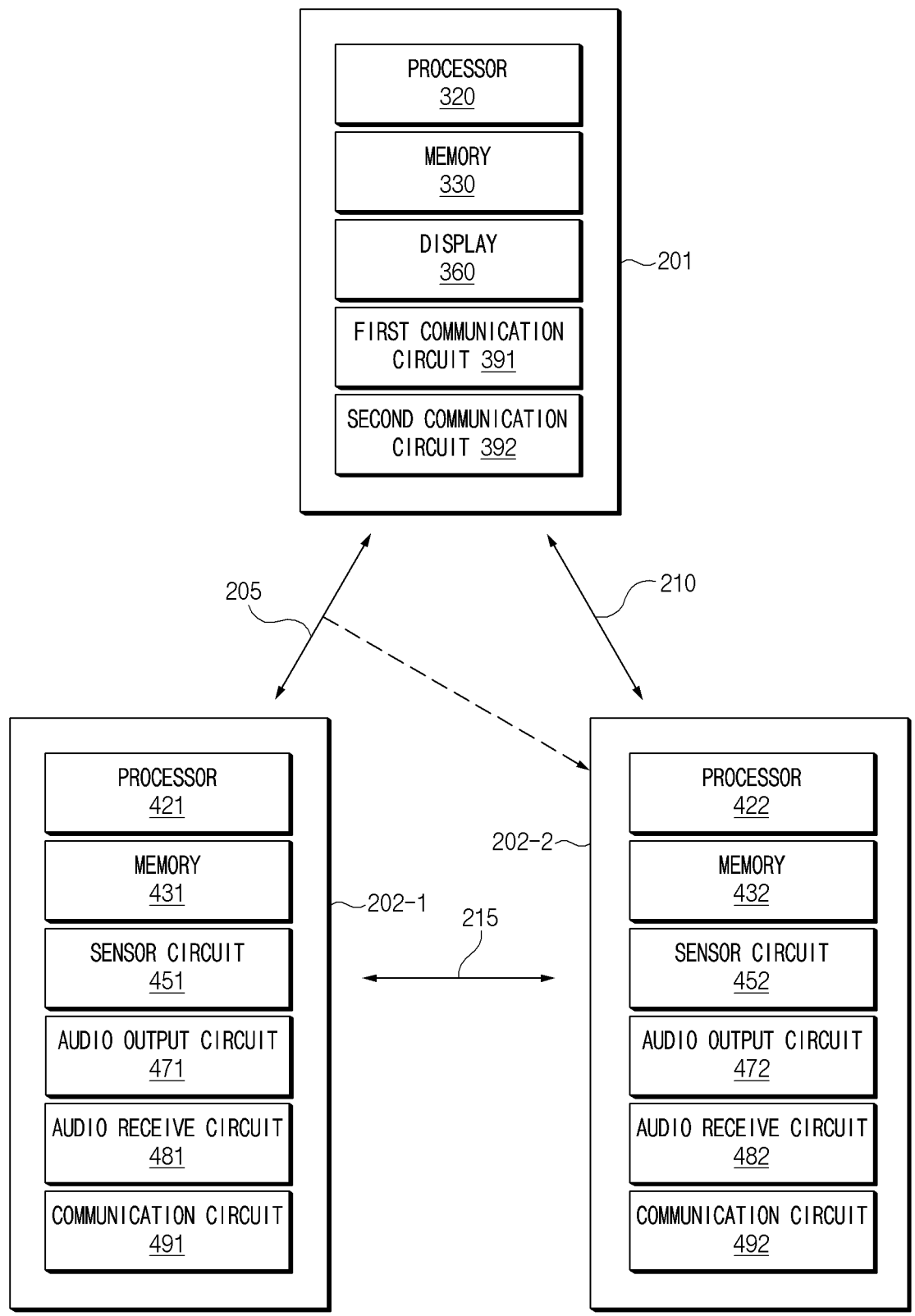
FIG. 3 illustrates a block diagram of an electronic device and a wireless audio device, according to an embodiment.

FIG. 3 illustrates a block diagram of an electronic device 201 and a wireless audio device 202, according to an embodiment.

According to an embodiment, the electronic device 201 may include a processor 320 (e.g., the processor 120 of FIG. 1), a memory 330 (e.g., the memory 130 of FIG. 1), a first communication circuit 391 (e.g., the communication module 190 of FIG. 1), a display 360 (e.g., the display module 160 of FIG. 1), and/or a second communication circuit 392 (e.g., the communication module 190 of FIG. 1). The processor 320 may be operatively connected with the memory 330, the display 360, the first communication circuit 391, and the second communication circuit 392. The memory 330 may store at least one instruction that when executed, cause the processor 320 to perform various operations of the electronic device 201. The second communication circuit 392 may be configured to support wireless communication based on a Bluetooth protocol (e.g., Bluetooth legacy and/or BLE) The first communication circuit 391 may be configured to support communication based on a wireless communication standard (e.g., Cellular and/or WiFi) except for the Bluetooth protocol. The electronic device 201 may further include a component not illustrated in FIG. 3. For example, the electronic device 201 may further include an audio input/output device (e.g., the audio module 170 of FIG. 1) and/or a housing.

The electronic device 201 may be connected with the first wireless audio device 202-1 through the first link 205. For example, the electronic device 201 and the first wireless audio device 202-1 may make communication with each other in unit of a time slot set based on a clock of the primary device of the first link 205. The electronic device 201 may be connected with the second wireless audio device 202-2 through the second link 210. For example, the electronic device 201 may be connected with the first wireless audio device 202-1 and establish the second link 210. According to an embodiment, the second link 210 may be omitted.

According to an embodiment, the first wireless audio device 202-1 may include a processor 421 (e.g., the processor 120 of FIG. 1), a memory 431 (e.g., the memory 130 of FIG. 1), a sensor circuit 451 (e.g., the sensor module 176 of FIG. 1), an audio output circuit 471 (e.g., the audio module 170 of FIG. 1), an audio receive circuit 481 (e.g., the audio module 170 of FIG. 1) 170), and/or a communication circuit 491 (e.g., the communication module 190 of FIG. 1).

The processor 421 may be operatively connected with the sensor circuit 451, the communication circuit 491, the audio output circuit 471, the audio receive circuit 481, and the memory 431.

The sensor circuit 451 may include at least one sensor. The sensor circuit 451 may detect information on a wearing status indicating whether a wearer (i.e., a user) wears the first wireless audio device 202-1, biometric information of the wearer, and/or movement of the wearer. For example, the sensor circuit 451 may include a proximity sensor for sensing the wearing state, a biometric sensor (e.g., heart rate sensor) for detecting biometric information, and/or a motion sensor (e.g., an acceleration sensor) for detecting motion. According to one example, the sensor circuit 451 may further include at least one of a bone conduction sensor and an acceleration sensor. According to another embodiment, the bone conduction sensor may be disposed to be near a skin to sense the bone conduction. For example, the acceleration sensor may be configured to sense vibration information in kHz unit through sampling in kHz unit higher than general motion sampling. The processor 421 may performing voice recognizing, voice sensing, tap sensing, and/or wearing sensing under a noise environment through vibration generated based on a meaningful axis (at least one axis of an x axis, a y axis, or a z axis) of the vibration information of the acceleration sensor.

The audio output circuit 471 may be configured to output a sound. The audio receive circuit 481 may include one microphone or a plurality of microphones. The audio receive circuit 481 may be configured to obtain an audio signal by using the one microphone or the plurality of microphones. According to an embodiment, each of the plurality of microphones may correspond to mutually different audio receive paths. For example, when the audio receive circuit 481 includes a first microphone and a second microphone, an audio signal obtained through the first microphone and an audio signal obtained through the second microphone may be referred to as mutually different audio channels. The processor 421 may obtain audio data by using at least one microphone of the plurality of microphones connected with the audio receive circuit 481. The processor 421 may dynamically select and determine at least one microphone, which is to obtain audio data, of the plurality of microphones. The processor 421 may obtain the audio data by performing beamforming using the plurality of microphones. The memory 431 may store at least one instruction that when executed, cause the processor 421 to perform various operations of the first wireless audio device 202-1.

According to an embodiment, the processor 421 may obtain audio data through at least one of the audio receive circuit 481 or the sensor circuit 451. For example, the processor 421 may obtain audio data through at least one microphone connected with the audio receive circuit 481. The processor 421 may obtain audio data by sensing vibration corresponding to an audio signal through the sensor circuit 451. For example, the processor 421 may obtain audio data through at least one of a motion sensor, a bone conduction sensor, an acceleration sensor and/or the like, including combinations and/or multiples thereof. The processor 421 may be configured to process (e.g., noise suppression, noise cancellation, echo cancellation, and/or the like, including combinations and/or multiples thereof) audio data which is obtained through various paths (e.g., at least one of the audio receive circuit 481 or the sensor circuit 451).

The first wireless audio device 202-1 may further include a component illustrated in FIG. 1. For example, the first wireless audio device 202-1 may further include an indicator (e.g., the display module 160 of FIG. 1), an input interface (e.g., the interface 177 of FIG. 1), and/or a housing.

According to an embodiment, the second wireless audio device 202-2 may include a processor 422 (e.g., the processor 120 of FIG. 1), a memory 432 (e.g., the memory 130 of FIG. 1), a sensor circuit 452 (e.g., the sensor module 176), an audio output circuit 472 (e.g., the audio module 170 of FIG. 1), an audio receive circuit 482, and/or a communication circuit 492 (e.g., the communication module 190 of FIG. 1).

According to an embodiment, the processor 422, the memory 432, the sensor circuit 452, the audio output circuit 472, the audio receive circuit 482, or the communication circuit 492 of the second wireless audio device 202-2 may have the same functions as the functions of the processor 421, the memory 431, the sensor circuit 451, the audio output circuit 471, the audio receive circuit 481, or the communication circuit 491 of the first wireless audio device 202-1.

The second wireless audio device 202-2 may further include a component illustrated in FIG. 1. For example, the second wireless audio device 202-2 further include an indicator (e.g., the display module 160 of FIG. 1), an audio input device (e.g., the audio module 170 of FIG. 1), an input interface (e.g., the interface 170 of FIG. 1) and/or a housing.

Figure 4:
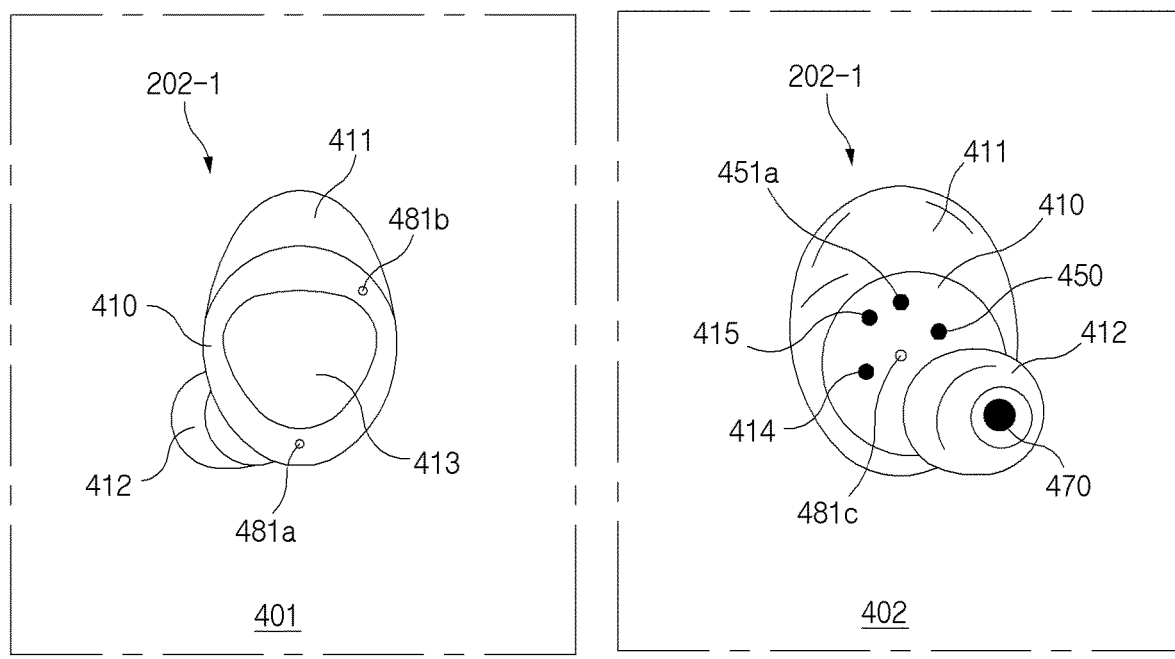
FIG. 4 illustrates a front view and a rear view of the first wireless audio device, according to an embodiment.

FIG. 4 illustrates a front view 401 and a rear view 402 of the first wireless audio device 202-1, according to an embodiment.

Hereinafter, the structure of the first wireless audio device 202-1 will be described. For the convenience of explanation, the duplicated description will be omitted, and the second wireless audio device 202-2 may have the structure the same as or similar to the structure of the first wireless audio device 202-1.

Referring to front view 401 of the first wireless audio device 202-1, the first wireless audio device 202-1 may include a housing 410. The housing 410 may form at least a portion of an outer appearance of the first wireless audio device 202-1. The housing 410 may include a button 413 and a plurality of microphones 481a and 481b disposed on a first surface (e.g., a surface facing the outside when worn) of the housing 410. The button 413 may be configured to receive a user input (e.g., a touch input or a push input). The first microphone 481a and the second microphone 481b may be included in the audio receive circuit 481. The first microphone 481a and the second microphone 481b may be disposed in a direction facing an outer portion of a user to sense a sound, when the first wireless audio device 202-1 is worn. The first microphone 481a and the second microphone 481b may be referred to as external microphones. The first microphone 481a and the second microphone 481b may sense an external sound of the housing 410. For example, the first microphone 481a and the second microphone 481b may sense an ambient sound generated around the first wireless audio device 202-1. The ambient sound sensed by the first wireless audio device 202-1 may be output by a speaker 470. According to an embodiment, the first microphone 481a and the second microphone 481b may be microphones for a noise cancellation function (e.g., active noise cancellation (ANC)) of the first wireless audio device 202-1. Alternatively, the first microphone 481a and the second microphone 481b may be microphones for a function (e.g., a transparency function or an ambient aware function) of hearing an ambient sound of the first wireless audio device 202-1. The first microphone 481a and the second microphone 481b may include various types of microphones including an electronic condenser microphone (ECM) and a micro electro mechanical system (MEMS). The first microphone 481a and the second microphone 481b may be of the same type or different types. A wing tip 411 may be coupled to a peripheral portion of the housing 410. The wing tip 411 may include an elastic material. The wing tip 411 may be detached from the housing 410 or attached to the housing 410. The wing tip 411 may improve the wearability of the first wireless audio device 202-1.

Referring to rear view 402 of the first wireless audio device 202-1, the first wireless audio device 202-1 may include a first electrode 414, a second electrode 415, a proximity sensor 450, a third microphone 481c, and the speaker 470 which are disposed on a second surface (e.g., a face facing the user when worn) of the housing 410. The speaker 470 may include the audio output circuit 471 of FIG. 3. The speaker 470 may convert an electrical signal into a sound signal. The speaker 470 may output a sound out of the first wireless audio device 202-1. For example, the speaker 470 may convert an electrical signal into a sound to be audibly recognized by a user and may output the conversion result. At least a portion of the speaker 470 may be disposed inside the housing 410. The speaker 470 may be coupled to an ear tip 412 through an end portion of the housing 410. The ear tip 412 may have the shape of an internally hollowed cylinder. For example, when the ear tip 412 is coupled to the housing 410, the sound (audio data) output from the speaker 370 may be transmitted to an external object (e.g., a user) through the hollowed structure of the ear tip 412.

According to an embodiment, the first wireless audio device 202-1 may include a sensor 451a (e.g., an acceleration sensor, a bone conduction sensor, a gyro sensor, and/or the like, including combinations and/or multiples thereof) disposed on a second surface of the housing 410. Although FIG. 4 illustrates the location and the shape of the sensor 451a, embodiments of the disclosure are not limited thereto. For example, the sensor 451a may be disposed in the housing 410 such that the sensor 451a is not exposed to the outside. The sensor 451a may be placed at a location for making contact with the ear of the wearer or a portion, which makes contact with the ear of the wearer, of the housing 410, when worn.

The ear tip 412 may be formed of an elastic material (or a flexible material). The ear tip 412 may assist the first wireless audio device 202-1 such that the first wireless audio device 202-1 is inserted into the ear of the user, in close contact with the ear of the user. For example, the ear tip 412 may be formed of a silicon material. At least a portion of the ear tip 412 may be deformed depending on the shape (e.g., the kernel shape of the ear) of an external object. According to various embodiments of the disclosure, the ear tip 412 may be formed through the combination of at least two of silicon, a foam, or a plastic material. For example, a first area, which is inserted into the ear of the user and makes contact with the ear of the user, of the ear tip 412 may be formed of a silicon material, and a second area, in which the housing 410 is inserted, may be formed of a plastic material. The wing tip 412 may be detached from the housing 410 or attached to the housing 410. The first electrode 414 and the second electrode 415 may be connected with an external power source (e.g., a case), and may receive an electrical signal from the external power source, such as to charge a battery (e.g., the battery 189 of FIG. 1) disposed within the first wireless audio device 202-1. The proximity sensor 450 may be used to sense the wearing status of the user. The proximity sensor 450 may be disposed inside the housing 410. At least a portion of the proximity sensor 450 may be disposed to be exposed to an outer appearance of the first wireless audio device 202-1. The first wireless audio device 202-1 may determine whether the user wears the first wireless audio device 202-1, based on the data measured by the proximity sensor 450. For example, the proximity sensor 450 may include an infrared (IR) sensor. The IR sensor may sense whether the housing 410 makes contact with the body of the user. The first wireless audio device 202-1 may determine whether the user wears the first wireless audio device 202-1, based on the sensing of the IR sensor. The proximity sensor 450 is not limited to the IR sensor, but may be implemented by using various types of sensors (e.g., the acceleration sensor or the gyro sensor). The third microphone 481*a* may be disposed in a direction facing a user to sense a sound, when the first wireless audio device 202-1 is worn. The third microphone 481*c* may be referred to as an inner microphone.

Figure 5:
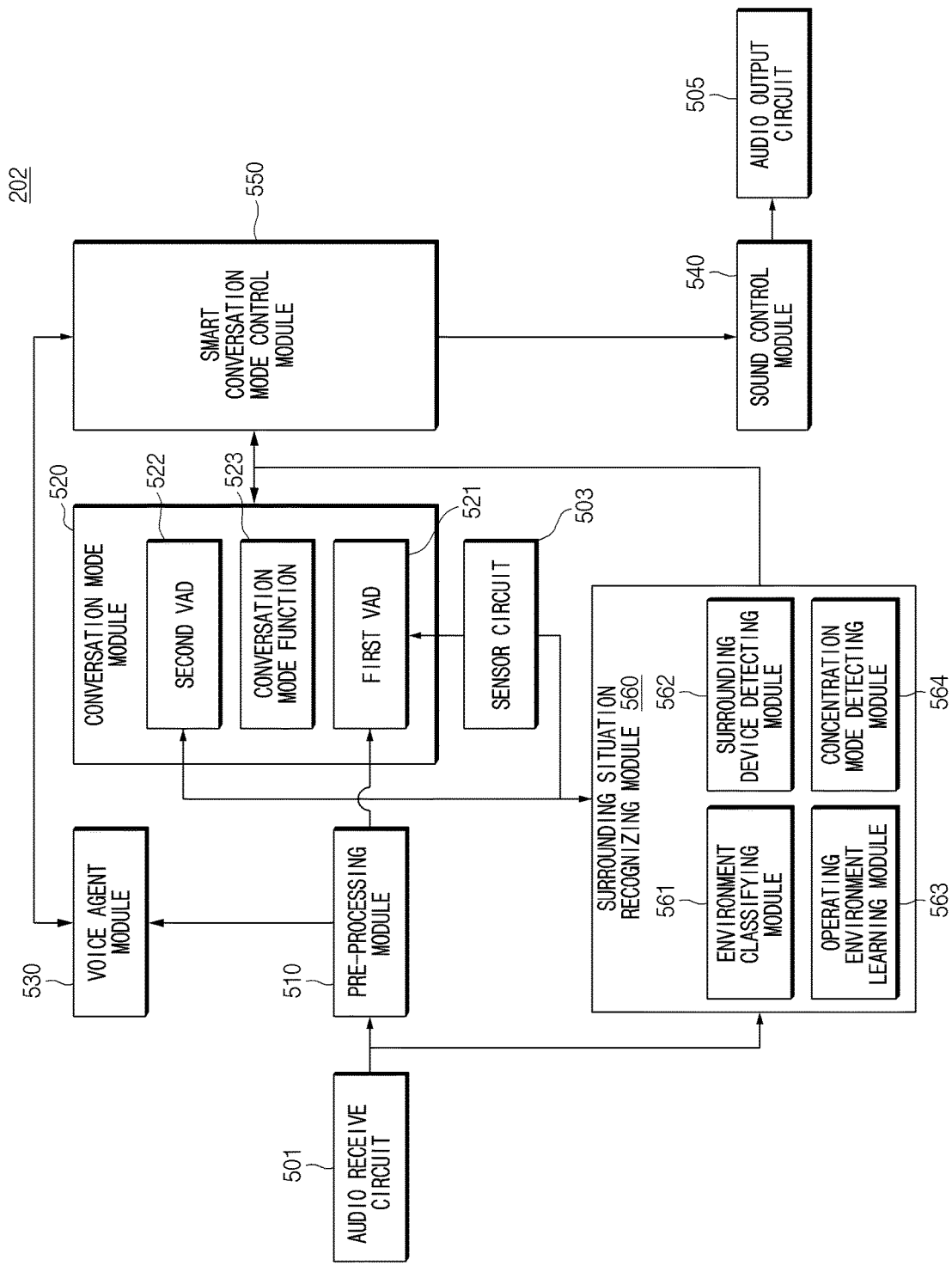
FIG. 5 illustrates a block diagram of a wireless audio device, according to an embodiment.

FIG. 5 illustrates a block diagram of the wireless audio device 202, according to an embodiment.

According to an embodiment, the components of FIG. 5 may be implemented by the first wireless audio device 202-1 or the second wireless audio device 202-2.

According to an embodiment, the wireless audio device 202 may include an audio receive circuit 501, a sensor circuit 503, an audio output circuit 505 or the combination thereof. According to an embodiment, the audio receive circuit 501 may correspond to the audio receive circuits 481 and 482 of FIG. 3. According to an embodiment, the audio receive circuit 501 may correspond to the microphones 481*a*, 481*b*, and 481*c* of FIG. 4. According to an embodiment, the sensor circuit 503 may correspond to the sensor circuits 451 and 452 of FIG. 3. According to an embodiment, the sensor circuit 503 may correspond to the proximity sensor 450 of FIG. 4. According to an embodiment, the audio output circuit 503 may correspond to the audio output circuits 471 and 472 of FIG. 3. According to an embodiment, the audio output circuit 505 may correspond to the speaker 470 of FIG. 4.

According to an embodiment, the wireless audio device 202 may obtain an audio signal through the audio receive circuit 501. According to an embodiment, the wireless audio device 202 may sense the movement of the wireless audio device 202 through the sensor circuit 503 (e.g., a motion sensor, an acceleration sensor and/or a gyro sensor).

According to an embodiment, when an audio signal (e.g., the voice signal) having a specified band (e.g., a human voice band) and a specified strength is sensed, the wireless audio device 202 may sense a voice signal from the audio signal.

According to an embodiment, the wireless audio device 202 may include a pre-processing module 510, a conversation mode module 520, a voice agent module 530, a sound control module 540, a smart conversation mode control module 550, a surrounding situation recognizing module 560, or the combination thereof.

According to an embodiment, the pre-processing module 510, the conversation mode module 520, the voice agent module 530, the sound control module 540, the smart conversation mode control module 550, the surrounding situation recognizing module 560, or the combination thereof may be implemented in the form of one or more software modules. According to an embodiment, the components are logically separated, and arbitrary programs, threads, applications, or codes performing the same function may be in place of the components.

According to an embodiment, the pre-processing module 510 may perform pre-processing for a sound (or an audio signal) received through the audio receive circuit 501. According to an embodiment, the pre-processing for the audio signal may include the echo cancellation of the audio signal, the noise reduction of the audio signal, the signal filtering for a specified band of the audio signal, the changing the sampling rate of an audio input signal, and/or the like, including combinations and/or multiples thereof.

According to an embodiment, the voice agent module 530 may obtain an audio signal using the audio receive circuit 501 and/the pre-processing module 510 and may recognize a wake-up utterance (e.g., "Hi-Bixby") and/or specified voice utterance. According to an embodiment, the specified voice utterance may include a voice command (e.g., a command of starting or ending a conversation mode) for the control of the conversation mode.

According to an embodiment, the voice utterance for instructing the starting of the conversation mode may include the wake-up utterance (e.g., "Hi-Bixby") and a voice command. For example, the voice command may have the form such as "Hi Bixby, start the conversation mode." The voice utterance for instructing the starting of the conversation mode may include only the voice command, such as "Start the conversation mode."

For example, the voice utterance for instructing the ending of the conversation mode may include wake-up utterance for waking up the voice agent and a voice command. The voice command may have the form such as "Hi Bixby, end the conversation mode." The voice utterance for instructing the ending of the conversation mode may include only the voice command, such as "End the conversation mode without the wake-up utterance."

According to an embodiment, the voice agent module 530 may transmit information for instructing the starting or the ending of the conversation mode to the conversation mode module 520 and/or the smart conversation mode control module 550, based on the voice utterance.

According to an embodiment, the surrounding situation recognizing module 560 may include an environment classifying module 561, a surrounding device detecting module 562, an operating environment learning module 563, a concentration mode detecting module 564, and/or the like, including combinations and/or multiples thereof.

According to an embodiment, the environment classifying module 561 may classify environments based on an audio signal. For example, the environment classifying module 561 may sense the environment, based on at least one of background noise, a signal to noise ratio (SNR), and/or the type of the noise of the audio signal. For example, the environment classifying module 561 may identify the environment of the wireless audio device 202 by comparing environment information stored in a memory (e.g., the memories 431 and 432 of FIG. 3) with at least one of the strength of the background noise, the SNR, and/or the type of the noise. For another example, the environment classifying module 561 may identify the environment of the wireless audio device 202 by inputting the at least one of the strength of the background noise, the SNR, and/or the type of the noise into an artificial intelligent (AI) model generated through machine learning. According to an embodiment, the at least one of the strength of the background noise, the SNR, or the type of the noise may be identified through Fast Fourier Transform for the audio signal.

According to an embodiment, the environment classifying module 561 may identify a location and/or a place based on a sensor signal. According to an embodiment, the environment classifying module 561 may identify the location and/or the place based on a GPS signal, a WiFi signal, and/or a Bluetooth signal. According to an embodiment, the environment classifying module 561 may identify a location of the wireless audio device 202 based on the GPS signal, the WiFi signal, and/or the Bluetooth signal, and may identify a place based on the identified position. For example, the environment classifying module 561 may identify the place of the wireless audio device 202 by comparing the environment information, which is stored in a memory (e.g., the memories 431 and 432 of FIG. 3), with at least one of the GPS signal, the WiFi signal, or the Bluetooth signal. For another example, the environment classifying module 561 may identify the place of the wireless audio device 202, by inputting the at least one of the GPS signal, the WiFi signal, and/or the Bluetooth signal into the artificial intelligent (AI) model generated through machine learning.

According to an embodiment, the environment classifying module 561 may provide information on the identified environment to the conversation mode module 520 and/or the smart conversation mode control module 550.

According to an embodiment, the surrounding device detecting module 562 may scan an external electronic device. According to an embodiment, the surrounding device detecting module 562 may identify an external electronic device within a specified distance, based on the sensor signal from the sensor circuit 503. According to an embodiment, the surrounding device detecting module 562 may detect the external electronic device using a signal based on a Bluetooth (e.g., BLE), ultra wide band (UWB), and/or WiFi. According to an embodiment, the surrounding device detecting module 562 may identify a distance to the external electronic device, based on the characteristic (e.g., a signal strength, the difference between transmitting and receiving times, and/or the like, including combinations and/or multiples thereof) of the sensor signal from the sensor circuit 503. According to an embodiment, the surrounding device detecting module 562 may identify the distance to the external electronic device based on a received signal strength indication (RSSI), a time difference of arrival (TDoA), and/or two way ranging (TWR). According to an embodiment, the surrounding device detecting module 562 may identify the distance to the external electronic device based on the characteristic of the sensor signal from the sensor circuit 503, such as by using a look-up table stored in a memory (e.g., the memory 431 or 432 of FIG. 3).

According to an embodiment, the surrounding device detecting module 562 may identify whether the identified external electronic device is a device registered in the electronic device 201 and/or the wireless audio device 202. According to an embodiment, the surrounding device detecting module 562 may identify whether the identified external electronic device is a device registered in the electronic device 201 and/or the wireless audio device 202 based on a signal received from the external electronic device during the detection of the external electronic device. According to an embodiment, the surrounding device detecting module 562 may identify whether the identified external electronic device is a device registered in the electronic device 201 and/or the wireless audio device 202 based on identification information (e.g., a device name, a media access control (MAC) address) of the external electronic device.

According to an embodiment, the surrounding device detecting module 562 may identify a current situation as a situation in which a conversation between a user of the electronic device 201 and/or the wireless audio device 202 and a user of the external electronic device is possible, when the identified external electronic device stays within a specified distance for a specified time or more. According to an embodiment, the surrounding device detecting module 562 may identify the current situation as the situation allowing a conversation, when the registered external electronic device stays within the first distance for a first time or more. According to an embodiment, the surrounding device detecting module 562 may identify the current situation as the situation allowing a conversation, when an external electronic device, which is not registered, stays within a second distance for a second time or more. For example, the first distance may be longer than the second distance. For example, the first time may be shorter than the second time. For another example, the first time may be equal to the second time.

According to an embodiment, the surrounding device detecting module 562 may calculate a score for conversation possibility based on a distance to the external electronic device and/or a stay time of the external electronic device. According to an embodiment, the score for the conversation possibility may be increased, such as when the distance to the external electronic device is reduced. According to an embodiment, the score for the conversation possibility may be increased, such as when the stay time of the external electronic device is increased. According to an embodiment, the surrounding device detecting module 562 may identify the current situation as the situation in which a conversation between a user of the electronic device 201 and/or the wireless audio device 202 and a user of the external electronic device is possible, such as when the score for the conversation possibility exceeds a threshold score.

According to an embodiment, the surrounding device detecting module 562 may identify the score for the conversation possibility based on the conditional probability for executing the conversation mode, depending on stay times spent at the location of the external electronic device. According to an embodiment, the surrounding device detecting module 562 may identify the score for the conversation possibility, which is output as the stay time spent at the location of the external electronic device is input into an artificial intelligent (AI) model.

According to an embodiment, the surrounding device detecting module 562 may provide, to the conversation mode module 520 and/or the smart conversation mode control module 550, a signal indicating that the current situation is the situation allowing a conversation, and/or a score for conversation possibility.

According to an embodiment, the operating environment learning module 563 may manage information on a location for activating the conversation mode. According to an embodiment, the operating environment learning module 563 may register and/or manage the information on a location for activating a conversation mode specified by a user. According to an embodiment, the information on the location may include an address, a building name, a shop name, the classification of a place (e.g., a café, a restaurant, a mart, a gym, a library, or a station), or a combination thereof.

According to an embodiment, the operating environment learning module 563 may perform machine learning for an AI model, based on information on the registered location and/or information indicating whether the conversation mode is activated in the past. According to an embodiment, another information may be more utilized in the machine learning for the AI model. For example, the AI model may experience the machine learning, based on a sensor signal received from the sensor circuit 503 and indicating a user posture. For another example, an environment may be sensed based on at least one of background noise, an SNR, or the type of noise of the audio signal, which is contained in the audio signal received from the audio receive circuit 501. The operating environment learning module 563 may perform the machine learning for the AI model based on the environment.

According to an embodiment, the operating environment learning module 563 may receive data (e.g., a GPS signal or a WiFi signal) for identifying the location of the wireless audio device 202. According to an embodiment, the operating environment learning module 563 may receive data (e.g., data of an acceleration sensor, a gyro sensor, a magnetic sensor, and/or the like, including combinations and/or multiples thereof) for identifying the posture of a user who wears the wireless audio device 202. According to an embodiment, the operating environment learning module 563 may receive an audio signal (e.g., at least one of background noise, an SNR, or the type of noise of an audio signal) from the audio receive circuit 501.

According to an embodiment, the operating environment learning module 563 may identify a location and/or a place based on data (e.g., location data) for identifying a position. According to an embodiment, the operating environment learning module 563 may identify information on a current location and a current place indicated through location information, which is contained in location data, by referring to a map DB (not illustrated). The information on the location may include information on an address. The information on a place may include a building name, a shop name, the category of a place (e.g., business information (a café, a restaurant, a mart, a gym, a library, or a station)), or a combination thereof.

According to an embodiment, the operating environment learning module 563 may detect the posture of the user based on the data (e.g., posture data) for identifying the posture of a user who wears the wireless audio device 202. According to an embodiment, the operating environment learning module 563 may detect the posture (e.g., moving, stopping, standing up, sitting down, and/or the like, including combinations and/or multiples thereof) of the user, based on the posture data from a sensor (e.g., an acceleration sensor, a gyro sensor, and a magnetic sensor) having at least three axes.

According to an embodiment, the operating environment learning module 563 may classify scenes based on an audio signal. According to an embodiment, the operating environment learning module 563 may identify a scene corresponding to the audio signal based on at least one of background noise, an SNR, or the type of noise of the audio signal. According to an embodiment, the scene may be used to classify a place (e.g., a restaurant, a café, a company, a gym, a library, a mart, a street, a construction site, a beach, a hotel, and/or the like, including combinations and/or multiples thereof) and/or an environment (e.g., lots of people, few people, a high level of noise, a low level of noise, and/or the like, including combinations and/or multiples thereof) in which the wireless audio device 202 is positioned, depending on the audio signal.

According to an embodiment, the operating environment learning module 563 may identify the similarity between a scene, which corresponds to a place category, of a plurality of scenes and an audio signal.

According to an embodiment, the operating environment learning module 563 may detect whether the current situation is the situation allowing the conversation. According to an embodiment, the operating environment learning module 563 may identify whether the current situation is the situation allowing the conversation, based on the information on the position, the information on the place, the information on the posture of the user, the information on the scene, a place learning model 940 (see, e.g., FIG. 9), or the combination thereof.

According to an embodiment, the operating environment learning module 563 may identify the score for the conversation possibility based on the information on the position, the information on the place, the information on the posture of the user, the information on the scene, or the combination thereof.

According to an embodiment, the operating environment learning module 563 may identify the score for the conversation possibility based on the conditional probability for executing the conversation mode depending on the information on the position, the information on the place, the information on the posture of the user, the information on the scene, or the combination thereof.

According to an embodiment, the operating environment learning module 563 may identify the score for the conversation possibility based on the conditional probability for executing the conversation mode depending on at least one of the information on the position, the information on the place, the information on the posture of the user, or the information on the scene.

According to an embodiment, the concentration mode detecting module 564 may identify the score for the conversation possibility by using the weighted average of a score for conversation possibility, which is based on the information on the position, a score for conversation possibility, which is based on the information on the place, a score for conversation possibility, which is based on the information on the posture of the user, or a score for conversation possibility, which is based on the information on the scene.

According to an embodiment, the operating environment learning module 563 may provide, to the conversation mode module 520 and/or the smart conversation mode control module 550, a signal indicating that the current situation is the situation allowing a conversation, and/or a score for conversation possibility.

According to an embodiment, the concentration mode detecting module 564 may obtain context information. According to an embodiment, the context information may include content data, application data, input data, schedule data, or the combination thereof.

According to an embodiment, the content data may include information on the type of content, which is being reproduced, and/or details of content. According to an embodiment, the content, which is being reproduced, may be content which is being reproduced in background and/or in foreground.

According to an embodiment, the content may be media content (an image, a video, and/or a sound). According to an embodiment, the application data may include the type of an application, which is being executed, and/or information execution time of the application. According to an embodiment, the application that is being reproduced may be an application that is being reproduced in foreground and/or in background. According to an embodiment, input data may include information on the continuity and/or repeatability of a user input. According to an embodiment, the schedule data may include calendar information and/or information on a to-do list, which is registered in the electronic device 201 and/or the wireless audio device 202.

According to an embodiment, the concentration mode detecting module 564 may identify whether the content, which is being reproduced, is specified content. According to an embodiment, the specified content may be content including details associated with education and/or business. According to an embodiment, the specified content may be content specified by a user.

According to an embodiment, the concentration mode detecting module 564 may identify whether the application, which is being executed, is specified application. According to an embodiment, the specified application may be an application associated with a document work, education, language learning, and/or reading. According to an embodiment, the specified application may be an application specified by a user.

According to an embodiment, the concentration mode detecting module 564 may identify whether the user input lasted for a specified duration of time or more based on the input data. According to an embodiment, the concentration mode detecting module 564 may identify whether the user input is repeated a specified number of times or more based on the input data.

According to an embodiment, the concentration mode detecting module 564 may identify whether a user is currently working based on the schedule data.

According to an embodiment, the concentration mode detecting module 564 may identify whether the user is currently performing a single task based on the schedule data.

According to an embodiment, the concentration mode detecting module 564 may identify whether the current situation is the situation allowing the conversation based on a content classification result, an application classification result, an input type classification result, a business type classification result, or the combination thereof.

According to an embodiment, the concentration mode detecting module 564 may identify that the current situation is the situation allowing the conversation, when the content, which is being reproduced, is not the specified content, based on the content classification result. According to an embodiment, the concentration mode detecting module 564 may identify that the current situation is the situation allowing the conversation, when the application, which is being executed, is not the specified application, based on the application classification result. According to an embodiment, the concentration mode detecting module 564 may identify that the current situation is the situation allowing the conversation when the user input has not lasted for the specified duration of time or more based on the input type classification result. According to an embodiment, the concentration mode detecting module 564 may identify whether the current situation is the situation allowing the conversation, when the user input is not repeated by the specified number of times or more, based on the input type classification result. According to an embodiment, the concentration mode detecting module 564 may identify that the current situation is the situation allowing the conversation, when the user is not currently performing a single task, based on the business type classification result.

According to an embodiment, the concentration mode detecting module 564 may identify whether the current situation is the situation allowing the conversation based on at least one of the content classification result, the application classification result, the input type classification result, the business type classification result, and/or the like, including combinations and/or multiples thereof. For example, when any one (or more) of the content classification result, the application classification result, the input type classification result, or the business type classification result indicates that the current situation is the situation allowing the conversation, the concentration mode detecting module 564 may identify that the current situation is the situation allowing the conversation.

According to an embodiment, the concentration mode detecting module 564 may identify the score for the conversation possibility based on the application classification result, the input type classification result, the business type classification result, or the combination thereof.

According to an embodiment, the concentration mode detecting module 564 may identify the score for the conversation possibility, based on the conditional probability for executing the conversation mode, when the content, which is being reproduced, is not the specified content, based on the content classification result. According to an embodiment, the concentration mode detecting module 564 may identify the score for the conversation possibility, based on the conditional probability for executing the conversation mode, when the application, which is being executed, is not the specified application, based on the application classification result. According to an embodiment, the concentration mode detecting module 564 may identify the score for the conversation possibility based on the conditional probability for executing the conversation mode, when the user input has not lasted for the specified duration of time or more, based on the input type classification result. According to an embodiment, the concentration mode detecting module 564 may identify the score for the conversation possibility based on the conditional probability for executing the conversation mode, when the user input is not repeated by the specified number of times or more based on the input type classification result. According to an embodiment, the concentration mode detecting module 564 may identify the score for the conversation possibility, based on the conditional probability for executing the conversation mode, when the user is not currently performing a single task, based on the business type classification result.

According to an embodiment, the concentration mode detecting module 564 may identify the score for the conversation possibility, depending on the conditional probability for executing the conversation mode, based on at least one of the content classification result, the application classification result, the input type classification result, or the business type classification result.

According to an embodiment, the concentration mode detecting module 564 may identify the score for the conversation possibility by using the weighted average of a score for conversation possibility, which is based on a content classification result, a score for conversation possibility, which is based on the application classification result, a score for conversation possibility, which is based on the input type classification result, and/or a score for conversation possibility, which is based on the business type classification result.

According to an embodiment, the concentration mode detecting module 564 may output the signal indicating that the current situation is the situation allowing a conversation, and/or the score for conversation possibility, in the form of output data.

According to an embodiment, the conversation mode module 520 may include a first voice activity detection (VAD) 521, a second VAD 522, a conversation mode function 523, or the combination thereof.

According to an embodiment, the conversation mode module 520 may determine whether to sense an utterance of a wearer (e.g., a user) and/or an utterance of an outsider (e.g., a person (e.g., an outsider or a counterpart) other than the wearer) based on data from the surrounding situation recognizing module 560.

According to an embodiment, the conversation mode module 520 may determine whether to sense the utterance based on a signal from the surrounding device detecting module 562, the operating environment learning module 563, the concentration mode detecting module 564, or the combination thereof. According to an embodiment, the conversation mode module 520 may determine whether to sense the utterance, when at least one of the surrounding device detecting module 562, the operating environment learning module 563, or the concentration mode detecting module 564 indicates that the current situation is the situation allowing the conversation. For another example, the conversation mode module 520 may determine whether to sense the utterance when the surrounding device detecting module 562, the operating environment learning module 563, and the concentration mode detecting module 564 each indicates that the current situation is the situation allowing the conversation.

According to an embodiment, the conversation mode module 520 may determine whether to sense the utterance based on the score for the conversation possibility identified by the surrounding device detecting module 562, the operating environment learning module 563, the concentration mode detecting module 564, or the combination thereof. According to an embodiment, the conversation mode module 520 may determine sensing of the utterance when the score for the conversation possibility identified by at least one of the surrounding device detecting module 562, the operating environment learning module 563, or the concentration mode detecting module 564 exceeds a threshold score. For another example, the conversation mode module 520 may determine the sensing of the utterance when the scores for the conversation possibility identified by both the surrounding device detecting module 562, the operating environment learning module 563, and the concentration mode detecting module 564 exceed the threshold score.

According to an embodiment, the first VAD 521 may sense whether the wearer of the wireless audio device 202 makes an utterance. According to an embodiment, the first VAD 521 may sense whether the wearer (e.g., the user) of the wireless audio device 202 makes the utterance based on a voice signal sensed through the audio receive circuit 501. According to an embodiment, the first VAD 521 may sense the utterance (e.g., the utterance of the wearer) of the user based on a voice signal when a specified motion is sensed through the sensor circuit 503, while the voice signal is sensed through the audio receive circuit 501. According to an embodiment, the specified motion, which is a motion sensed through the utterance of the wearer of the wireless audio device 202, may be sensed through the sensor circuit 503. According to an embodiment, the motion sensed through the utterance of the wearer may be identified in the form of a motion or a vibration, through the motion sensor, the acceleration sensor, and/or the gyro sensor. The motion sensed through the utterance of the wearer may be introduced into the motion sensor, the acceleration sensor, and/or the gyro sensor in the form similar to an input into the bone conduction microphone.

According to an embodiment, the first VAD 521 may obtain information at a time point to start the utterance of the wearer and a time point to end the utterance of the wearer, based on the specified motion and the voice signal.

According to an embodiment, the second VAD 522 may sense whether a wearer (e.g., a user) and/or an outsider (e.g., a person (e.g., an outsider or a counterpart) other than the wearer) makes an utterance. According to an embodiment, the second VAD 522 may sense whether the wearer (e.g., a user) and/or the outsider (e.g., a person (e.g., an outsider or a counterpart) other than the wearer) makes the utterance, based on a voice signal sensed through the audio receive circuit 501.

According to an embodiment, the second VAD 522 may identify and/or specify an utterance duration of the outsider. According to an embodiment, the second VAD 522 may identify and/or specify the utterance duration of the outsider based on a motion of the wireless audio device 202, which is sensed through the sensor circuit 503. For example, the second VAD 522 may identify and/or specify the utterance duration of the outsider by excluding a duration in which utterance of the wearer is identified through the first VAD 521 from a duration in which an utterance is identified.

According to an embodiment, the second VAD 522 may sense the utterance of the outsider based on a voice signal when a specified motion is not sensed through the sensor circuit 503 while the voice signal is being sensed through the audio receive circuit 501.

According to an embodiment, the second VAD 522 may obtain information on a time point to start the utterance of the outsider and a time point to end the utterance of the outsider based on the specified motion and the voice signal.

According to an embodiment, the conversation mode function 523 may distinguish between requests for starting and/or ending a conversation mode, based on a user input. For example, the user input may include a voice command of a user, a touch input of the user, or a button input of the user.

According to an embodiment, the conversation mode module 520 may determine whether a current situation is a conversation situation through the first VAD 521, the second VAD 522, the conversation mode function 523, or the combination thereof.

According to an embodiment, the conversation mode module 520 may determine whether the current situation is the conversation situation, based on an utterance status of a user and/or an utterance of an outsider, which is sensed through the first VAD 521 and/or the second VAD 522. According to an embodiment, the conversation mode module 520 may determine whether the current situation is the conversation situation based on the user input identified using the conversation mode function 523.

According to an embodiment, the conversation mode module 520 may determine that the current situation is the conversation situation when the utterance of the user is maintained for a specified time. For another example, the conversation mode module 520 may determine that the current situation is the conversation situation when an utterance of a counterpart is maintained for a specified time after the utterance of the user is ended. According to an embodiment, the length of the specified time may be determined based on an ambient sound. For example, the conversation mode module 520 may determine the length of the specified based on at least one of the sensitivity of background noise of a sound obtained through an external microphone, the value of an SNR, or the type of noise. For example, the conversation mode module 520 may increase the length of the specified time under an environment of a higher level of noise.

According to an embodiment, the conversation mode module 520 may determine that the current situation is not the conversation situation when the voice signal is not sensed for the specified time during the conversation mode.

According to an embodiment, the conversation mode module 520 may determine a score for indicating a conversation situation based on an utterance status of a user and/or an utterance of an outsider, which is sensed through the first VAD 521 and/or the second VAD 522. According to an embodiment, the conversation mode module 520 may identify a score for the conversation situation based on a conditional probability for executing a conversation mode based on the utterance status of the user and/or the utterance of the outsider According to an embodiment, the conversation mode module 520 may transmit, to the smart conversation mode control module 550, a signal for indicating the determination of the conversation situation and/or the score for the conversation situation.

According to an embodiment, the smart conversation mode control module 550 may determine whether the conversation mode is activated or deactivated in response to the signal for indicating the determination of the conversation situation and/or the score for the conversation situation. According to an embodiment, the smart conversation mode control module 550 may determine the activation and/or the deactivation of the conversation mode based on the signal indicating that the current situation is the situation allowing a conversation, and/or the score for conversation possibility.

According to an embodiment, the smart conversation mode control module 550 may determine the activation of the conversation mode when the surrounding situation recognizing module 560 determines that the current situation is the situation allowing the conversation, and the conversation mode module 520 determines that the current situation is the conversation situation.

According to an embodiment, the smart conversation mode control module 550 may determine the activation of the conversation mode based on the score for the conversation situation and/or the score for the conversation possibility. For example, the smart conversation mode control module 550 may determine the activation of the conversation mode when the weight average of the score for the conversation situation and the score for the conversation possibility exceeds threshold scores. According to an embodiment, the smart conversation mode control module 550 may determine the activation of the conversation mode when the score for the conversation situation exceeds a first threshold score and when the score for the conversation possibility exceeds a second threshold value.

According to an embodiment, the smart conversation mode control module 550 may activate the conversation mode for a first timeout. According to an embodiment, the timeout may represent the length of a time for which the conversation mode is activated. According to an embodiment, the timeout may represent the length of the time for which the conversation mode is shifted from an activation mode to a deactivation mode, after the utterance of the user and/or the outsider is finished. According to an embodiment, the first timeout may be a preset timeout (e.g., 5, 10, 15 seconds). According to an embodiment, the first timeout may be a timeout set by the user.

According to an embodiment, the smart conversation mode control module 550 may determine whether to extend the timeout. According to an embodiment, the smart conversation mode control module 550 may determine whether to extend the timeout from the first timeout to the second timeout. According to an embodiment, the second timeout may have the length of a time extended from the first timeout.

According to an embodiment, the smart conversation mode control module 550 may determine whether to extend the timeout, based on that a keyword is detected from the utterance of the wearer and/or the outsider.

According to an embodiment, the smart conversation mode control module 550 may variously set the length of the timeout extended, based on the type of the detected keyword. According to an embodiment, the smart conversation mode control module 550 may variously set the length of the timeout extended based on the position, the place, or the scene of the wireless audio device 202, or the combination thereof. According to an embodiment, the smart conversation mode control module 550 may variously set the length of the timeout extended based on the environment in which the wireless audio device 202 is positioned.

According to an embodiment, the smart conversation mode control module 550 may determine whether to extend the timeout based on a user input for the inquiry about the extension of the timeout. According to an embodiment, the smart conversation mode control module 550 may output a signal (e.g., an audio signal and/or a display signal) for indicating the inquiry about the extension of the timeout when the extension of the timeout is identified as being necessary, and may determine whether to extend the timeout based on the user input for the output signal.

According to an embodiment, the smart conversation mode control module 550 may determine whether to extend the timeout without making an inquiry about the extension of the timeout.

According to an embodiment, the smart conversation mode control module 550 may control the sound control module 540 depending on the activation and/or the deactivation of the conversation mode. According to an embodiment, the smart conversation mode control module 550 may control an output sound of the audio output circuit 505 through the sound control module 540 depending on the activation and/or the deactivation of the conversation mode.

According to an embodiment, the smart conversation mode control module 550 may control an extent of controlling Active Noise Cancellation (ANC) and/or an ambient sound, which is performed by the sound control module 540. According to an embodiment, the smart conversation mode control module 550 may control the activation and/or the deactivation of a function of controlling the ANC and/or the ambient sound, which is performed by the sound control module 540.

According to an embodiment, the sound control module 540 may control the ANC and/or the ambient sound. For example, the sound control module 540 may adjust a sound volume level or may be set to be in a mute state. For example, the sound control module 540 may control the extent of the ANC and/or the strength of the ambient sound.

According to an embodiment, the sound control module 540 may obtain an ambient sound and perform noise cancellation based on the ambient sound. According to an embodiment, the sound control module 540 may obtain an ambient sound using an external microphone and may perform noise cancellation by using the obtained ambient sound.

According to an embodiment, the sound control module 540 may be set to provide an ambient sound to a wearer. According to an embodiment, the sound control module 540 may obtain the ambient sound through an external microphone, and may output the obtained ambient sound through a speaker of the wireless audio device 202, such that the sound control module 540 may be set to provide the ambient sound to the wearer.

According to an embodiment, the sound control module 540 may amplify the strength of an ambient sound by controlling a gain value of the ambient sound. The sound control module 540 may amplify a duration, in which a voice is present, or a frequency band corresponding to the voice, in the ambient sound. The sound control module 540 may reduce the extent of the ANC in the conversation mode. The sound control module 540 may control an output volume of the audio signal.

According to an embodiment, the sound control module 540 may deactivate ANC and/or activate an ambient sound, in response to that a conversation mode is activated. The sound control module 540 may reduce the volume of a sound of music, which is being output, to a specific level or more or may be set to be in a mute state, in response to that the conversation mode is started, when the music is being output from the wireless audio device 202.

According to an embodiment, the sound control module 540 may recover the settings for the ANC and/or the settings for the ambient sound to settings before the conversation mode is activated, in response to that the conversation mode is deactivated. For example, the sound control module 540 may activate or deactivate the ANC and/or the ambient sound, depending on the settings of the ANC and/or the settings for the ambient sound, before the conversation mode is activated, when the conversation mode is deactivated.

For example, the sound control module 540 may recover the volume of an output sound of the wireless audio device 202 and/or the settings for the wireless audio device 202 to settings before the conversation mode is deactivated, in response to the conversation mode is deactivated.

Figure 6:
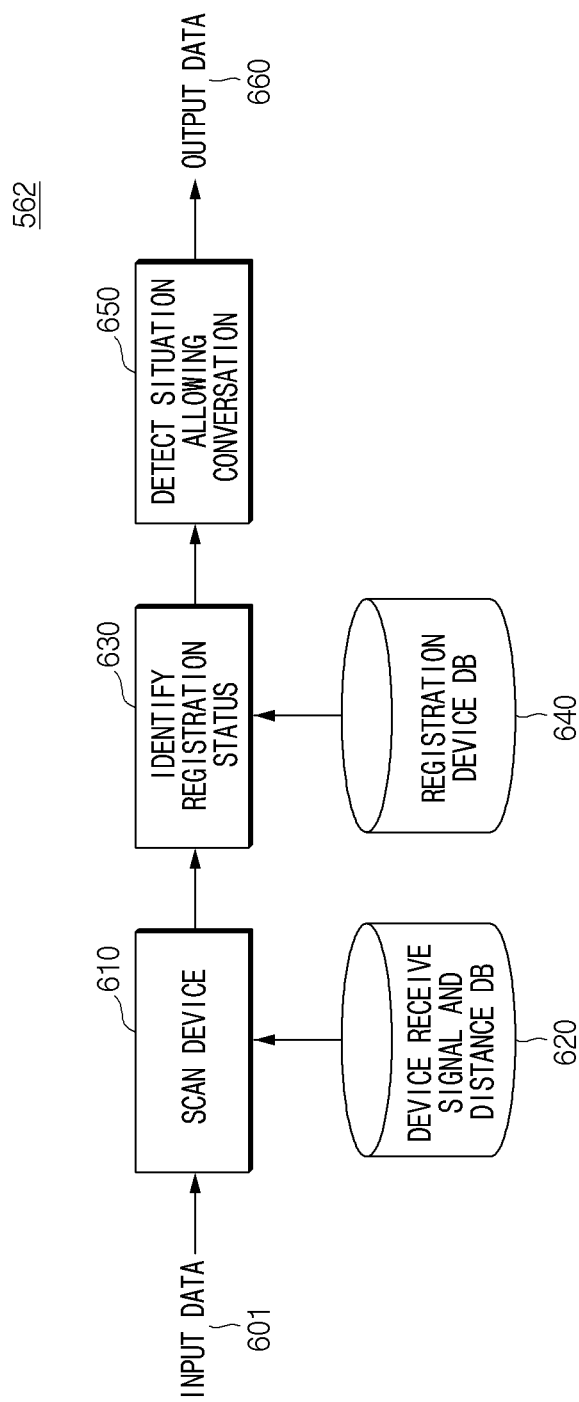
FIG. 6 is a view illustrating the operation in which a surrounding device detecting module of a wireless audio device generates output data, according to an embodiment of the disclosure.

FIG. 6 is a view illustrating the operation in which the surrounding device detecting module 562 of the wireless audio device 202 generates output data, according to an embodiment of the disclosure.

Referring to FIG. 6, the surrounding device detecting module 562 may receive input data 601. According to an embodiment, the input data 601 may be data obtained by the communication circuit (e.g., the communication circuit 491 or 492 of FIG. 3). According to an embodiment, the input data 601 may be data based on Bluetooth (e.g., BLE), a UWB, and/or WiFi. According to an embodiment, the input data 601 may be data (e.g., data based on an RSSI, a TDoA, and/or a TWR) for measuring a distance. According to an embodiment, the input data 601 may include identification information (e.g., a device name or a media access control (MAC) access) of the external electronic device.

According to an embodiment, the surrounding device detecting module 562 may perform an operation of scanning a device (610), based on the input data 601. According to an embodiment, the surrounding device detecting module 562 may scan an external electronic device, based on the input data 601. According to an embodiment, the surrounding device detecting module 562 may identify the external electronic device, based on the input data 601 and a device receive signal and distance database (DB) 620. According to an embodiment, the device receive signal and distance DB 620 may store information between data (e.g., data based on an RSSI, a TDoA, and/or a TWR) for measuring a distance and the distance. For example, the device receive signal and distance DB 620 may include information for indicating the relationship between the RSSI of a beacon signal and the distance.

According to an embodiment, the surrounding device detecting module 562 may perform an operation of identifying a registration state (630) based on the input data 601. According to an embodiment, the surrounding device detecting module 562 may perform the operation of identifying the registration state (630) when the external electronic device is within a specified distance.

According to an embodiment, the surrounding device detecting module 562 may identify whether the external electronic device is a device registered in the electronic device 201 and/or the wireless audio device 202. According to an embodiment, the surrounding device detecting module 562 may identify whether the external electronic device is the registered device based on the identification information (e.g., a device name or a media access control (MAC) access) of the external electronic device, which is included in the input data 601. According to an embodiment, the surrounding device detecting module 562 may identify whether the external electronic device is the registered device by retrieving, from a registration device DB 640, the identification information (e.g., the device name or the media access control (MAC) access) of the external electronic device, which is included in the input data 601. According to an embodiment, the registration device DB 640 may include identification information (e.g., the device name or the media access control (MAC) address) of the device registered in the electronic device 201 and/or the wireless audio device 202.

According to an embodiment, the surrounding device detecting module 562 may perform an operation of detecting a situation allowing a conversation (650).

According to an embodiment, the surrounding device detecting module 562 may identify the current situation as the situation allowing a conversation when an external electronic device, which is registered, stays within a first distance for a first time or more. According to an embodiment, the surrounding device detecting module 562 may identify the current situation as the situation allowing a conversation when an external electronic device, which is not registered, stays within a second distance for a second time or more. For example, the first distance may be longer than the second distance. For example, the first time may be shorter than the second time. For another example, the first time may be equal to the second time.

According to an embodiment, the surrounding device detecting module 562 may identify a score for conversation possibility based on a location and/or a stay time of the external electronic device. According to an embodiment, the surrounding device detecting module 562 may identify the score for the conversation possibility based on the conditional probability for executing the conversation mode depending on stay times spent at the location of the external electronic device. According to an embodiment, the surrounding device detecting module 562 may identify the score for the conversation possibility, which is output as the stay time spent at the location of the external electronic device and is input into an artificial intelligent (AI) model.

According to an embodiment, the surrounding device detecting module 562 may output the signal indicating that the current situation is the situation allowing a conversation and/or the score for conversation possibility in the form of the output data 660.

Figure 7:
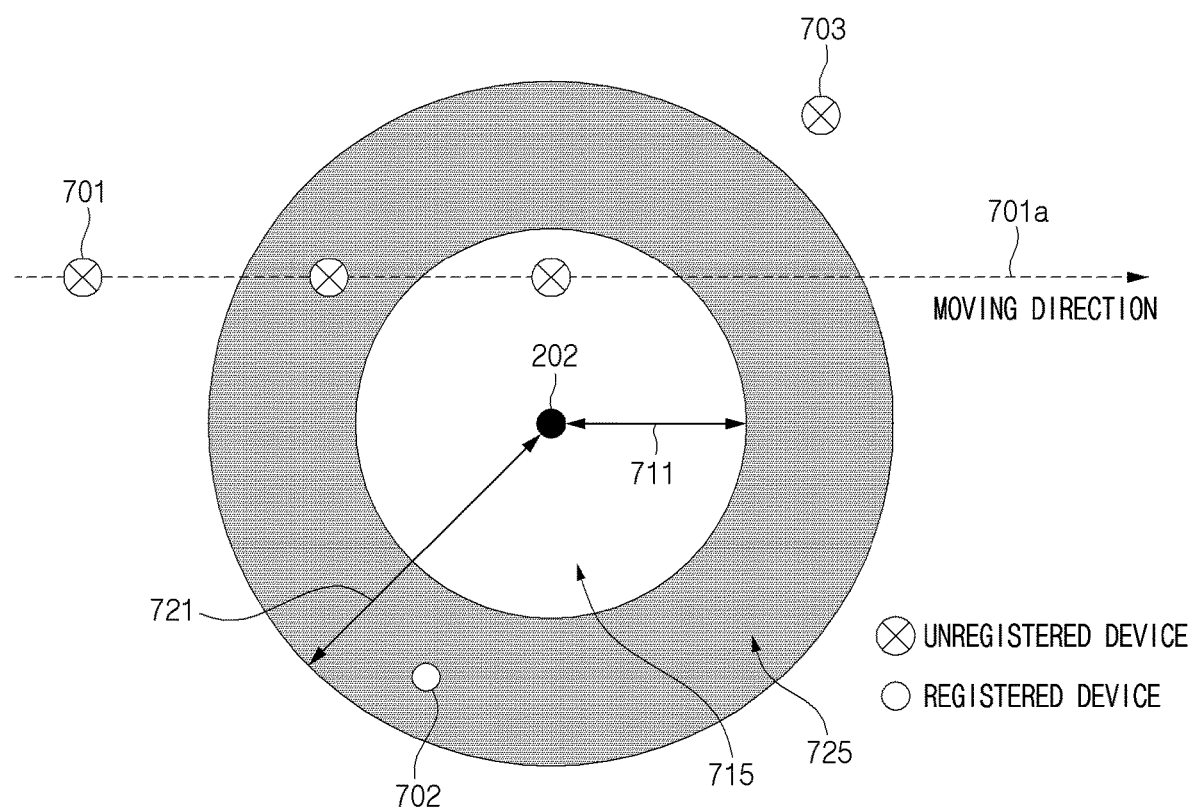
FIG. 7 is a view illustrating a situation in which a wireless audio device determines whether an external device is in a situation allowing a conversation, according to an embodiment of the disclosure.

FIG. 7 is a view illustrating a situation in which the wireless audio device 202 determines whether an external device is in a situation allowing a conversation.

Referring to FIG. 7, a plurality of devices 701, 702, and 703 are present relative to the wireless audio device 202. As an example, the first device 701 may move in a moving direction 701a, and the second device 702 and the third device 703 may be stationary. The first device 701 and the third device 703 may be unregistered devices, which are not registered in the wireless audio device 202, and the second device 702 may be a device registered in the wireless audio device 202.

According to an embodiment, the wireless audio device 202 may detect a device positioned within a first distance 711. According to an embodiment, the first distance 711 may be shorter than a second distance 721 that is able to be measured by the wireless audio device 202.

Referring to FIG. 7, the second device 702 may be identified as being positioned within the second distance 721. However, the third device 703 may be identified as not being positioned within the first distance 711. The first device 701 may be identified as being positioned within the first distance 711 or as not being positioned within the first distance 711, as the first device 701 moves in the moving direction 701*a*.

According to an embodiment, the wireless audio device 202 may identify whether a device positioned within the first distance 711 is a registered device. Referring to FIG. 7, the second device 702 may be identified as the registered device, which is within the second distance 721. However, even when the first device 701 is within the first distance 711, the first device 701 may not be identified as being the registered device.

According to an embodiment, the wireless audio device 202 may detect whether a current situation is a situation in which a conversation with the registered device positioned within the first distance 711 is possible. According to an embodiment, the wireless audio device 202 may detect whether a current situation is a situation in which a conversation with a device, which is positioned within the first distance 711 and is not registered, is possible.

According to an embodiment, when the first device 701 is present in a first area 715 for a first time or more, the surrounding device detecting module 562 may identify a user of the wireless audio device 202 as being in a situation allowing the conversation with a user of the first device 701. However, when the first device 701 is not present in the second area 725 for the second time or more, the surrounding device detecting module 562 may identify the user of the wireless audio device 202 as not being in a situation allowing the conversation with a user of the first device 701.

Figure 8:
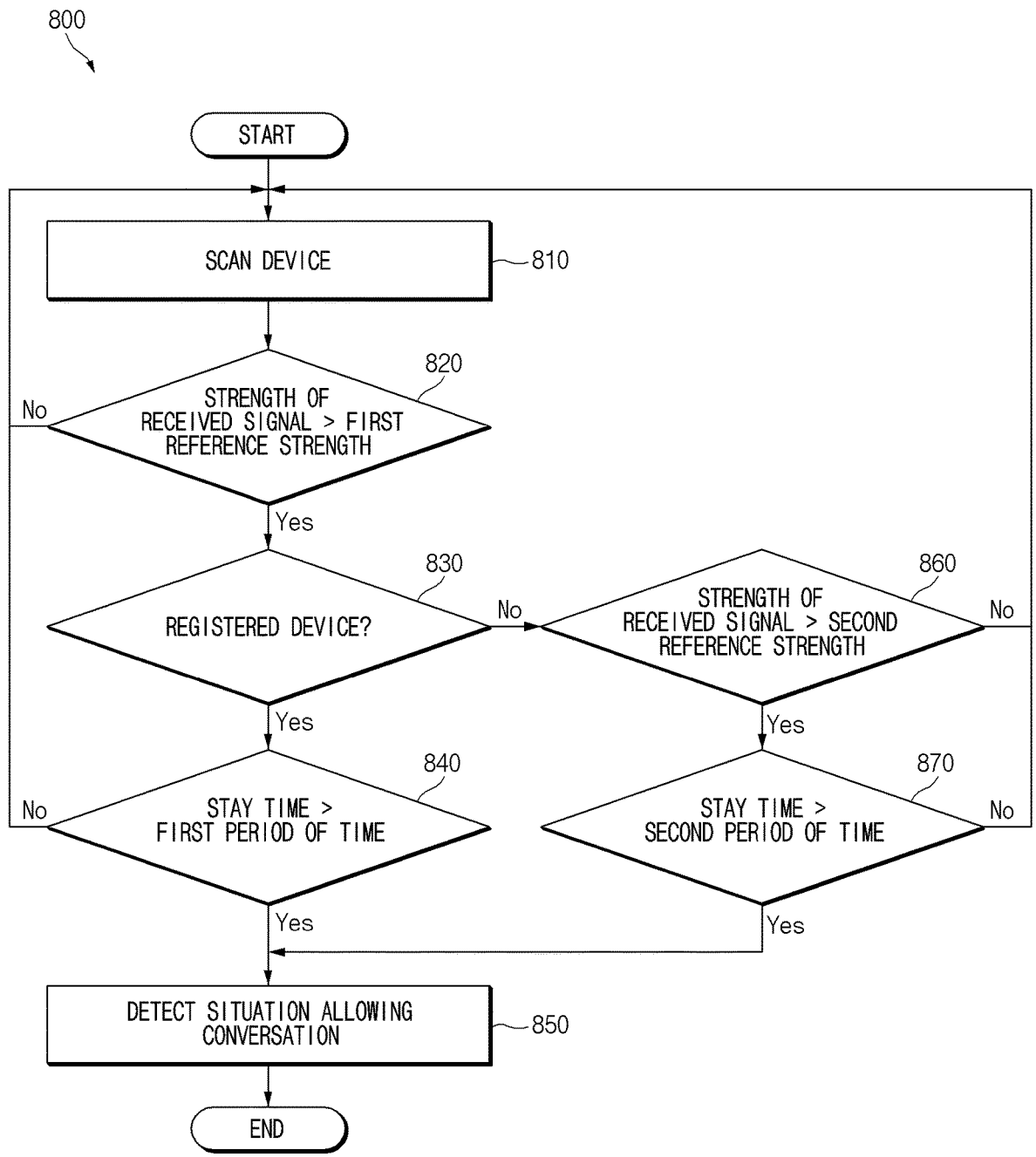
FIG. 8 is a flowchart illustrating a method in which a surrounding device detecting module of a wireless audio device generates output data, according to an embodiment of the disclosure.

FIG. 8 is a flowchart illustrating a method 800 in which the surrounding device detecting module 562 of the wireless audio device 202 generates output data, according to an embodiment of the disclosure.

Referring to FIG. 8, in operation 810, the surrounding device detecting module 562 may scan a device. According to an embodiment, the surrounding device detecting module 562 may scan the device by broadcasting a beacon signal and receiving a response signal to the beacon signal from the external electronic device.

In operation 820, the surrounding device detecting module 562 may determine whether the strength of the received signal is greater than a first reference strength. According to an embodiment, the surrounding device detecting module 562 may determine whether the strength of the response signal is greater than the first reference strength.

According to another embodiment, the surrounding device detecting module 562 may determine whether a distance, which is based on the strength of the response signal, is shorter than a distance based on the first reference strength. According to another embodiment, the distance, which is based on the strength of the response signal, may be identified by the device receive signal and distance DB 620.

According to an embodiment, the surrounding device detecting module 562 may perform operation 830 responsive to the strength of the received signal being greater than the first reference strength (determined as "Yes"). According to an embodiment, the surrounding device detecting module 562 may perform operation 810 again responsive to the strength of the received signal being less than the first reference strength (determined as "No").

In operation 830, the surrounding device detecting module 562 may determine whether the detected device is a registered device. According to an embodiment, the surrounding device detecting module 562 may determine whether a device, which is detected, is the registered device by referring to the registration device DB 640. According to an embodiment, the surrounding device detecting module 562 may determine the detected device as being the registered device responsive to a MAC address of the detected device being stored in the registration device DB.

According to an embodiment, the surrounding device detecting module 562 may perform operation 840 responsive to the detected device being the registered device (determined as "Yes"). According to an embodiment, the surrounding device detecting module 562 may perform operation 860 responsive to the detected device not being the registered device (determined as "No").

In operation 840, the surrounding device detecting module 562 may determine whether a stay time is longer than a first reference period of time.

According to an embodiment, the surrounding device detecting module 562 may perform operation 850 responsive to the stay time being longer than the first reference time (determined as "Yes"). According to an embodiment, the surrounding device detecting module 562 may perform operation 810 responsive to the stay time being shorter than the first reference time (determined as "No").

In operation 850, the surrounding device detecting module 562 may detect a situation allowing a conversation. According to an embodiment, the surrounding device detecting module 562 may detect that a current situation is the situation allowing the conversation with the detected device.

According to an embodiment, the surrounding device detecting module 562 may identify a score for conversation possibility based on a location and/or a stay time of the detected device. According to an embodiment, the surrounding device detecting module 562 may identify the score for the conversation possibility based on the conditional probability for executing the conversation mode depending on stay times spent at the location of the detected device. According to an embodiment, the surrounding device detecting module 562 may identify the score for the conversation possibility, which is output, as the stay time spent at the location of the detected device is input into an artificial intelligent (AI) model.

In operation 860, the surrounding device detecting module 562 may determine whether the strength of the received signal is greater than a second reference strength. According to an embodiment, the second reference strength may be greater than the first reference strength. According to another embodiment, the surrounding device detecting module 562 may determine whether the distance from the strength of the response signal is shorter than a second reference strength.

According to an embodiment, the surrounding device detecting module 562 may perform operation 870 responsive to the strength of the received signal being greater than a second reference strength (determined as "Yes"). According to an embodiment, the surrounding device detecting module 562 may perform operation 810 again responsive to the strength of the received signal is shorter than a second reference strength (determined as "No").

In operation 870, the surrounding device detecting module 562 may determine whether a stay time is longer than a second reference time. According to an embodiment, the second reference time may be longer than the first reference time.

According to an embodiment, the surrounding device detecting module 562 may perform operation 850 responsive to the stay time being longer than the second reference time (determined as "Yes"). According to an embodiment, the surrounding device detecting module 562 may perform operation 810 responsive to the stay time being shorter than the second reference time (determined as "No").

Figure 9:
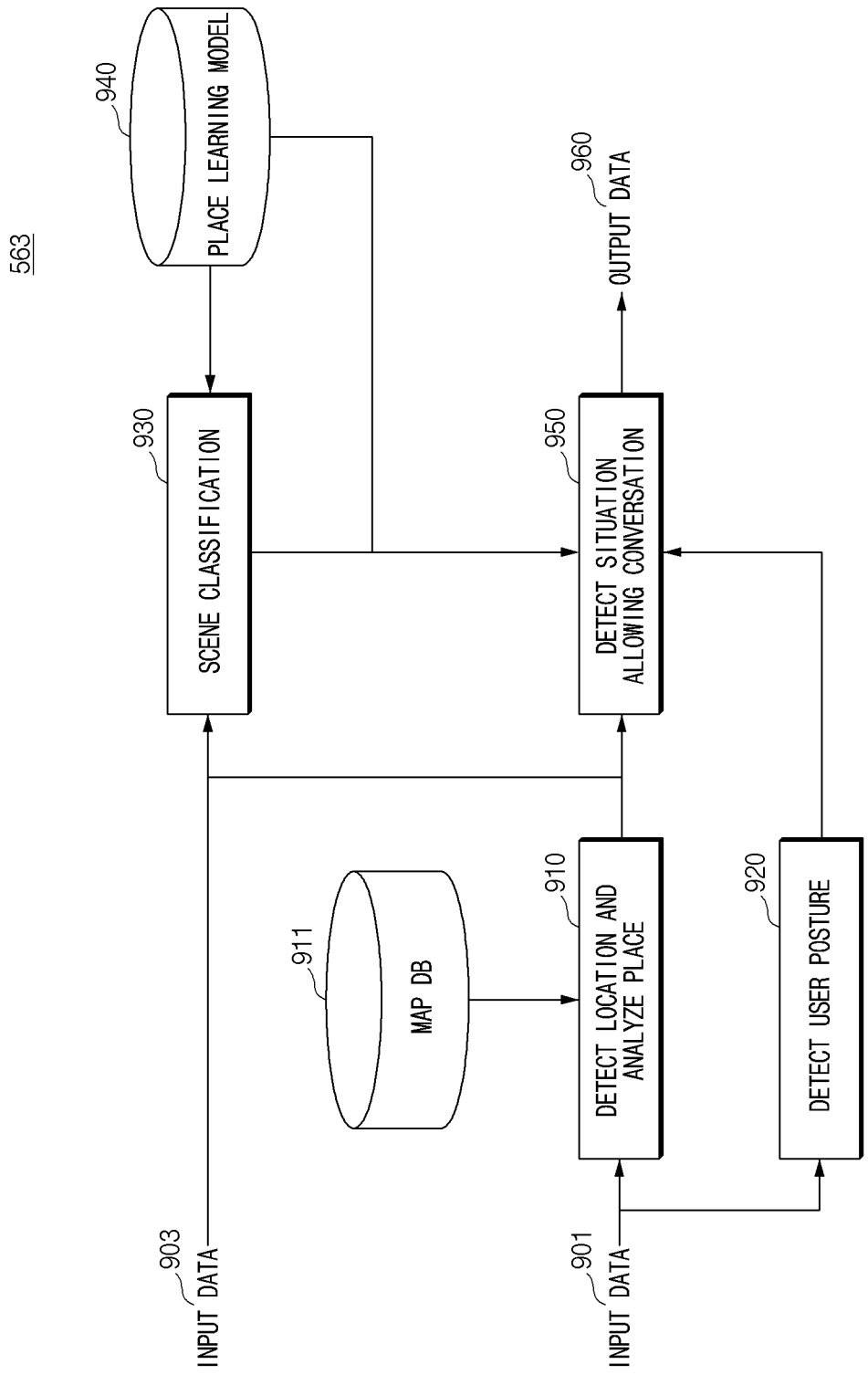
FIG. 9 is a view illustrating the operation in which an operating environment learning module of a wireless audio device generates output data, according to an embodiment of the disclosure.

FIG. 9 is a view illustrating the operation in which the operating environment learning module 563 of the wireless audio device 202 generates output data, according to an embodiment of the disclosure.

According to an embodiment, the operating environment learning module 563 may receive an input data 901 and/or an input data 903. According to an embodiment, the input data 901 may include data (e.g., a GPS signal, a WiFi signal, and/or the like, including combinations and/or multiples thereof) for identifying the location of the wireless audio device 202. According to an embodiment, the input data 901 may include data (e.g., data of an acceleration sensor, a gyro sensor, a magnetic sensor, and/or the like, including combinations and/or multiples thereof) for identifying the posture of a user who wears the wireless audio device 202. According to an embodiment, the input data 903 may include an audio signal. According to an embodiment, the input data 903 may include at least one of background noise, an SNR, and/or the type of noise of an audio signal, which is included in the audio signal, from the audio receive circuit 501.

According to an embodiment, the operating environment learning module 563 may perform an operation 910 of detecting a location and analyzing a place based on the input data 901. According to an embodiment, the operating environment learning module 563 may identify information on a current location and a current place indicated through location information, which is contained in the input data 901, by referring to a map DB 911. The information on the location may include information on an address. The information on a place may include a building name, a shop name, the category of a place (e.g., business information (a café, a restaurant, a mart, a gym, a library, or a station)), or a combination thereof.

According to an embodiment, the operating environment learning module 563 may perform an operation 920 of detecting a user posture based on the input data 901. According to an embodiment, the operating environment learning module 563 may detect the posture (e.g., moving, stopping, standing up, sitting down, and/or the like, including combinations and/or multiples thereof) of the user, based on the first input data 901 from a sensor (e.g., an acceleration sensor, a gyro sensor, a magnetic sensor, and/or the like, including combinations and/or multiples thereof) having at least three axes.

According to an embodiment, the operating environment learning module 563 may perform an operation 930 of classifying a scene based on the input data 903. According to an embodiment, the operating environment learning module 563 may identify a scene corresponding to the audio signal based on at least one of background noise, an SNR, or the type of noise of the audio signal in the input data 903. According to an embodiment, the scene may be used to classify a place (e.g., a restaurant, a café, a company, a gym, a library, a mart, a street, a construction site, a beach, a hotel, and/or the like, including combinations and/or multiples thereof) and/or an environment (e.g., lots of people, few people, a high level of noise, a low level of noise, and/or the like, including combinations and/or multiples thereof) in which the wireless audio device 202 is positioned, depending on the audio signal.

According to an embodiment, the operating environment learning module 563 may identify the similarity between a scene, which corresponds to a place category, of a plurality of scenes of a place learning model 940 and an audio signal.

According to an embodiment, the operating environment learning module 563 may perform an operation of detecting a situation allowing a conversation (950). According to an embodiment, the operating environment learning module 563 may identify whether a current situation is the situation allowing a conversation based on the information on the position, the information on the place, the information on the posture of the user, the information on the scene, the place learning model 940, or the combination thereof.

For example, when the information on the place indicates a place (e.g., library) specified as a place in which a conversation is difficult, the information on the posture of the user indicates a specified posture (e.g., sit down), and the information on the scene indicates a scene (e.g., a scene having the similarity is equal to or greater than a specified similarity) similar to a specified scene (e.g., library), the operating environment learning module 563 may identify a current situation as a situation in which a conversation is difficult. For example, when the information on the place indicates a place (e.g., a café) specified as a place in which a conversation is possible, the information on the posture of the user indicates a specified posture (e.g., sit down), and the information on the scene indicates a scene (e.g., a scene having the similarity is equal to or greater than a specified similarity) similar to a specified scene (e.g., a café), the operating environment learning module 563 may identify a current situation as a situation allowing a conversation.

For another example, the operating environment learning module 563 may identify a current situation as a situation allowing a conversation, by inputting, into the place learning model 940, at least one of the information on the position, the information on the place, the information on the posture of the user, or the information on the scene.

According to an embodiment, the operating environment learning module 563 may identify the score for the conversation possibility based on the information on the position, the information on the place, the information on the posture of the user, the information on the scene, the place learning model 940, or the combination thereof.

According to an embodiment, the operating environment learning module 563 may identify the score for the conversation possibility based on the conditional probability for executing the conversation mode, depending on the information on the position, the information on the place, the information on the posture of the user, the information on the scene, or the combination thereof.

According to an embodiment, the operating environment learning module 563 may identify the score for the conversation possibility based on the conditional probability for executing the conversation mode depending on at least one of the information on the position, the information on the place, the information on the posture of the user, or the information on the scene.

According to an embodiment, the concentration mode detecting module 564 may identify the score for the conversation possibility by using the weighted average of a score for conversation possibility, which is based on the information on the position, a score for conversation possibility, which is based on the information on the place, a score for conversation possibility, which is based on the information on the posture of the user, or a score for conversation possibility, which is based on the information on the scene.

According to an embodiment, the operating environment learning module 563 may output the signal indicating that the current situation is the situation allowing a conversation and/or the score for conversation possibility, in the form of output data 960.

Figure 10:
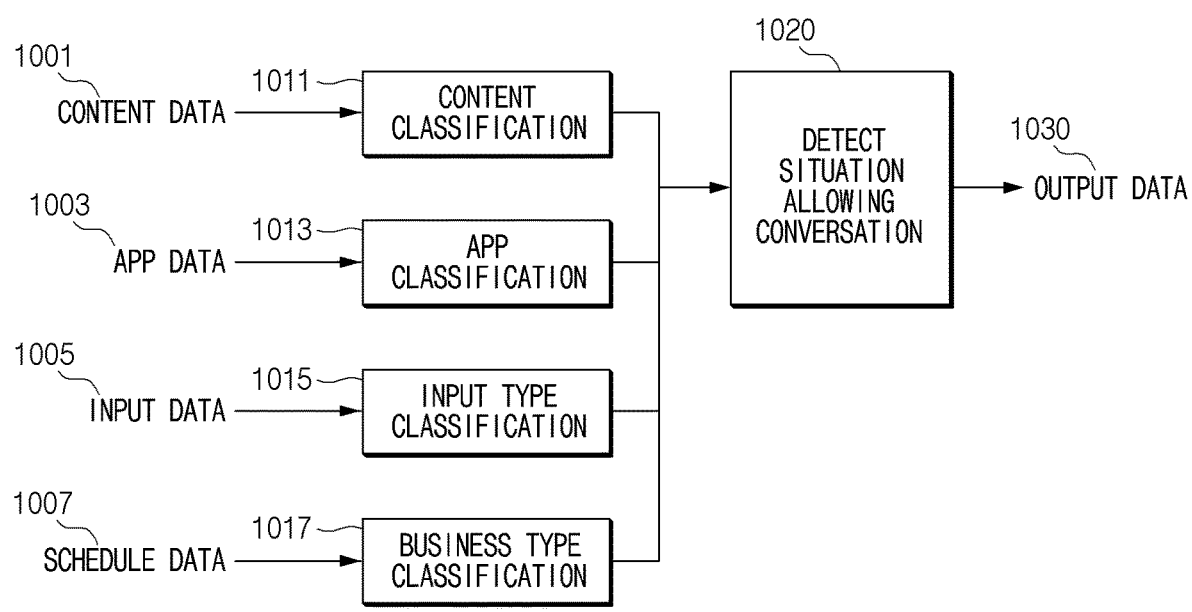
FIG. 10 is a view illustrating the operation in which a concentration mode detecting module of a wireless audio device generates output data, according to an embodiment of the disclosure.

FIG. 10 is a view illustrating the operation in which the concentration mode detecting module 564 of the wireless audio device 202 generates output data, according to an embodiment of the disclosure.

According to an embodiment, the concentration mode detecting module 564 may obtain context information. According to an embodiment, the context information may include content data 1001, application data ("app data") 1003, input data 1005, schedule data 1007, or the combination thereof.

According to an embodiment, the content data 1001 may include information on the type of content, which is being reproduced, and/or details of content. According to an embodiment, the content, which is being reproduced, may be content which is being reproduced in background and/or in foreground. According to an embodiment, the content may be media content (an image, a video, and/or a sound). According to an embodiment, the content may be media content (an image, a video, and/or a sound). According to an embodiment, an application data 1003 may include the type of an application, which is being executed, and/or information execution time of the application. According to an embodiment, the application which is being reproduced, may be an application which is being reproduced in foreground and/or in background. According to an embodiment, input data 1005 may include information on the continuity and/or repeatability of a user input. According to an embodiment, schedule data 1007 may include calendar information and/or information on a to-do list, which is registered in the electronic device 201 and/or the wireless audio device 202.

According to an embodiment, the concentration mode detecting module 564 may perform an operation of classifying content based on the content data 1001. According to an embodiment, the concentration mode detecting module 564 may identify whether the content, which is being reproduced, is specified content. According to an embodiment, the specified content may be content including details associated with education and/or business. According to an embodiment, the specified content may be content specified by a user.

According to an embodiment, the concentration mode detecting module 564 may perform an operation of classifying an application based on the application data 1003. According to an embodiment, the concentration mode detecting module 564 may identify whether the application, which is being reproduced, is specified application. According to an embodiment, the specified application may be an application associated with a document work, an education, language learning, and/or reading. According to an embodiment, the specified application may be an application specified by a user.

According to an embodiment, the concentration mode detecting module 564 may perform an operation of classifying an input type based on the input data 1005. According to an embodiment, the concentration mode detecting module 564 may identify whether the user input has lasted for a specified duration of time or more based on the input data 1005. According to an embodiment, the concentration mode detecting module 564 may identify whether the user input is repeated by a specified number of times or more based on the input data 1005.

According to an embodiment, the concentration mode detecting module 564 may perform an operation of classifying a business type, based on the schedule data 1007. According to an embodiment, the concentration mode detecting module 564 may identify whether the user is currently working based on the schedule data 1007. According to an embodiment, the concentration mode detecting module 564 may identify whether the user is currently performing a single task based on the schedule data 1007.

According to an embodiment, the concentration mode detecting module 564 may perform an operation of detecting a situation allowing a conversation (1020).

According to an embodiment, the concentration mode detecting module 564 may identify whether the current situation is in which a conversation is possible based on the content classification result, the application classification result, the input type classification result, the business type classification result, or the combination thereof.

According to an embodiment, the concentration mode detecting module 564 may identify that the current situation is the situation allowing the conversation, when the content, which is being reproduced, is not the specified content based on the content classification result. According to an embodiment, the concentration mode detecting module 564 may identify that the current situation is the situation allowing the conversation, when the application, which is being executed, is not the specified application based on the application classification result. According to an embodiment, the concentration mode detecting module 564 may identify whether the current situation is the situation allowing the conversation when the user input has not lasted for the specified duration of time or more based on the input type classification result. According to an embodiment, the concentration mode detecting module 564 may identify whether the current situation is the situation allowing the conversation when the user input is not repeated the specified number of times or more based on the input type classification result. According to an embodiment, the concentration mode detecting module 564 may identify that the current situation is the situation allowing the conversation, when the user is not currently performing a single task, based on the business type classification result.

According to an embodiment, the concentration mode detecting module 564 may identify whether the current situation is the situation allowing the conversation based on at least one of the content classification result, the application classification result, the input type classification result, or the business type classification result. For example, when any one of the content classification result, the application classification result, the input type classification result, or the business type classification result indicates that the current situation is the situation allowing the conversation, the concentration mode detecting module 564 may identify that the current situation is the situation allowing the conversation.

According to an embodiment, the concentration mode detecting module 564 may identify the score for the conversation possibility based on the application classification result, the input type classification result, the business type classification result, or the combination thereof.

According to an embodiment, the concentration mode detecting module 564 may identify the score for the conversation possibility based on the conditional probability for executing the conversation mode when the content, which is being reproduced, is not the specified content based on the content classification result. According to an embodiment, the concentration mode detecting module 564 may identify the score for the conversation possibility based on the conditional probability for executing the conversation mode when the application, which is being executed, is not the specified application based on the application classification result. According to an embodiment, the concentration mode detecting module 564 may identify the score for the conversation possibility based on the conditional probability for executing the conversation mode when the user input is not lasted for the specified time or more based on the input type classification result. According to an embodiment, the concentration mode detecting module 564 may identify the score for the conversation possibility based on the conditional probability for executing the conversation mode when the user input is not repeated by the specified number of times or more based on the input type classification result. According to an embodiment, the concentration mode detecting module 564 may identify the score for the conversation possibility based on the conditional probability for executing the conversation mode when the user is not currently performing a single task based on the business type classification result.

According to an embodiment, the concentration mode detecting module 564 may identify the score for the conversation possibility based on the conditional probability for executing the conversation mode based on at least one of the content classification result, the application classification result, the input type classification result, or the business type classification result.

According to an embodiment, the concentration mode detecting module 564 may identify the score for the conversation possibility by using the weighted average of a score for conversation possibility, which is based on a content classification result, a score for conversation possibility, which is based on the application classification result, a score for conversation possibility, which is based on the input type classification result, or a score for conversation possibility, which is based on the business type classification result.

According to an embodiment, the concentration mode detecting module 564 may output the signal indicating that the current situation is the situation allowing a conversation, and/or the score for conversation possibility in the form of output data 1030.

Figure 11:
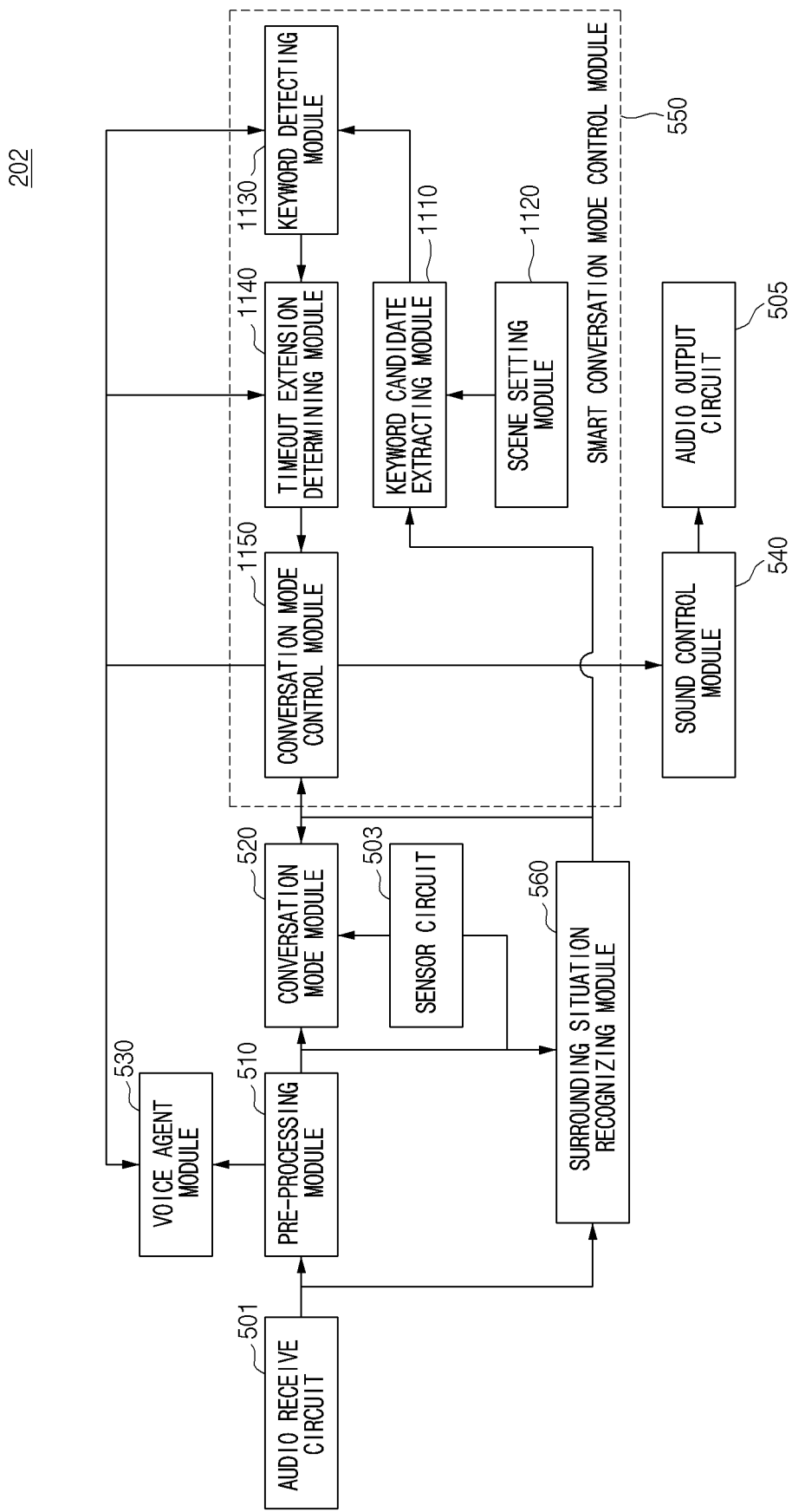
FIG. 11 is a view illustrating the operation in which a smart conversation mode control module of a wireless audio device controls a conversation mode, according to an embodiment of the disclosure.

FIG. 11 is a view illustrating the operation in which the smart conversation mode control module 550 of the wireless audio device 202 controls a conversation mode, according to an embodiment of the disclosure.

Referring to FIG. 11, the smart conversation mode control module 550 may include a keyword candidate extracting module 1110, a scene setting module 1120, a keyword detecting module 1130, a timeout extension determining module 1140, a conversation mode control module 1150, or the combination thereof.

According to an embodiment, the conversation mode control module 1150 may determine the activation and/or the deactivation of the conversation mode in response to the signal indicating the determination of a conversation situation and/or the score for the conversation situation. According to an embodiment, the conversation mode control module 1150 may determine the activation and/or deactivation of the conversation mode based on the signal indicating that the current situation is the situation allowing a conversation and/or the score for conversation possibility.

According to an embodiment, the conversation mode control module 1150 may determine the activation of the conversation mode when the surrounding situation recognizing module 560 determines that a current situation is the situation allowing the conversation and when the conversation mode module 520 determines the current situation is a conversation situation.

According to an embodiment, the conversation mode control module 1150 may determine the activation of the conversation mode based on the score for the conversation situation and/or the score for the conversation possibility. For example, the conversation mode control module 1150 may determine the activation of the conversation mode when the weight average of the score for the conversation situation and the score for the conversation possibility exceeds threshold scores. According to an embodiment, the conversation mode control module 1150 may determine the activation of the conversation mode when the score for the conversation situation exceeds a first threshold score and when the score for the conversation possibility exceeds a second threshold value.

According to an embodiment, the keyword candidate extracting module 1110 may extract a keyword candidate from a keyword database (not illustrated). According to an embodiment, the keyword candidate extracting module 1110 may determine a keyword candidate corresponding to the environment in which the wireless audio device 202 is positioned. According to an embodiment, the keyword candidate extracting module 1110 may determine a keyword candidate corresponding to a position, a place, or a scene in which the wireless audio device 202 is positioned, or the combination thereof. According to an embodiment, the scene may be determined by the scene setting module 1120. According to another embodiment, the information on the position, the place, or the scene in which the wireless audio device 202 is positioned, or the combination thereof may be obtained from the surrounding situation recognizing module 560.

According to an embodiment, the keyword detecting module 1130 may detect a keyword from the wording which is included in the audio signal from the audio receive circuit 501. According to an embodiment, the keyword detecting module 1130 may detect a keyword from the utterance of the user and/or the utterance of the outsider. According to an embodiment, the keyword detecting module 1130 may detect a keyword from the utterance of the user and/or the utterance of the outsider based on the keyword candidate.

According to an embodiment, the timeout extension determining module 1140 may determine whether to extend the timeout. According to an embodiment, the timeout extension determining module 1140 may determine whether to extend the timeout from the first timeout to the second timeout. According to an embodiment, the timeout may represent the length of a time for which the conversation mode is activated. According to an embodiment, the timeout may represent the length of the time for which the conversation mode is shifted from an activation mode to a deactivation mode, after the utterance of the user and/or the utterance the outsider is finished. According to an embodiment, the first timeout may be a preset timeout (e.g., 5, 10, 15 seconds). According to an embodiment, the first timeout may be a timeout set by the user. According to an embodiment, the second timeout may have the length of the extended time extending in addition to the first timeout.

According to an embodiment, the timeout extension determining module 1140 may determine the timeout to be extended based on that a keyword is detected from the utterance of the wearer and/or the utterance of the outsider.

According to an embodiment, the timeout extension determining module 1140 may variously determine the extended length of the timeout based on the type of the detected keyword. According to an embodiment, the timeout extension determining module 1140 may determine the length of the timeout to a first length with respect to the first keyword (e.g., three sets, repetition, pull-up) of keyword candidates set for the same scene (e.g., the gym) and may determine the length of the timeout to a second length with respect to a second keyword (e.g., running, or 10 minutes). According to an embodiment, the second length may be shorter than the first length.

According to an embodiment, the timeout extension determining module 1140 may variously determine the extended length of the timeout based on a position, a place, or a scene, in which the wireless audio device 202 is positioned, or the combination thereof. According to an embodiment, the timeout extension determining module 1140 may determine the length of the timeout to a first length with respect to a first scene (e.g., a gym) and may determine the length of the timeout to a second length with respect to a second scene (e.g., a café). According to an embodiment, the second length may be shorter than the first length.

According to an embodiment, the timeout extension determining module 1140 may variously set the length of the timeout extended based on the environment in which the wireless audio device 202 is positioned. According to an embodiment, the timeout extension determining module 1140 may determine the length of the timeout to a first length with respect to a first environment (e.g., a high level of noise) and may determine the length of the timeout to a second length with respect to a second environment (e.g., a low level of noise). According to an embodiment, the second length may be shorter than the first length.

According to an embodiment, the timeout extension determining module 1140 may determine whether to extend the timeout based on a user input for the inquiry about the extension of the timeout. According to an embodiment, the timeout extension determining module 1140 may output a signal (e.g., an audio signal and/a display signal) for indicating the inquiry about the extension of the timeout when the extension of the timeout is identified as being necessary and may determine whether to extend the timeout based on the user input for an output signal.

According to another embodiment, the timeout extension determining module 1140 may determine whether to extend the timeout, without making an inquiry about the extension of the timeout.

According to an embodiment, the conversation mode control module 1150 may prolong the conversation mode, which is activated, by the extended timeout, when the timeout is extended.

Following table 1 shows an example in which the smart conversation mode control module 550 activates and prolongs a conversation mode, depending on the conversation between a counterpart and a wearer.

TABLE 1

<Conversation Mode Deactivated>
  Surrounding Situation: Café, lots of people, standing posture, or surrounding device detected.
Counterpart: May I take your order?

TABLE 1-continued

<Conversation Mode Activated>
  Timeout: 10 seconds
Wearer: A small cup of Americano, please.
Counterpart: Yes, it is 3,000 won for a small cup of Americano. How would you like to pay?
Wearer: Please pay with this.
Counterpart: Yes, payment is done. I will call you as customer No. 6
<Keyword detected and timeout extended>
  Keyword: "Customer No. 6", "Call"
  Timeout: 30 seconds
Wearer: Thank you
Counterpart: "Customer No. 6, here is a glass of Americano is "
Wearer: Yes, bye
<Conversation Mode Deactivated>
  Timeout: 10 seconds The example in table 1 shows that the surrounding situation indicates a situation allowing a conversation. When the counterpart tries to start a conversation, the smart conversation mode control module 550 may activate a conversation mode. In this case, the timeout of the conversation mode may be 10 seconds. For another example, the smart conversation mode control module 550 may activate a conversation mode based on a voice command of a user. For example, the voice command of the user may be "Hi Bixby, start the conversation mode."

According to an embodiment, in the conversation mode, the smart conversation mode control module 550 may reduce the volume of a medium, which is outputting content, or change the medium to be in a mute state. According to an embodiment, in the conversation mode, the smart conversation mode control module 550 may control the sound using the sound control module 540. For example, the smart conversation mode control module 550 may deactivate the ANC and activate the ambient sound.

According to an embodiment, after the conversation mode is activated, a time difference between the utterance of the wearer and the utterance of the counterpart may be shorter than a timeout which is set. In this case, the smart conversation mode control module 550 may maintain the conversation mode activated.

According to an embodiment, the smart conversation mode control module 550 may detect a specified keyword from the utterance of the wearer and/or the utterance of the counterpart.

In an example of table 1, the smart conversation mode control module 550 may detect "customer No. 6" or "Call" as a specified keyword. According to an embodiment, the smart conversation mode control module 550 may detect "customer No. 6" or "Call" as a specified keyword, when the scene is determined to be "café."

According to an embodiment, the smart conversation mode control module 550 may extend a timeout when the specified keyword is detected. In an example of table 1, the smart conversation mode control module 550 may extend the timeout from 10 seconds to 30 seconds.

Thereafter, the smart conversation mode control module 550 may deactivate a conversation mode and may recover the timeout again after the extended timeout is elapsed.

Following table 2 shows another example in which the smart conversation mode control module 550 activates and prolongs a conversation mode depending on the conversation between a counterpart and a wearer.

TABLE 2

<Conversation Mode Deactivated>
   Surrounding situation: Café, lots of people, standing posture, or surrounding device detected.
   Counterpart: May I take your order?
<Conversation Mode Activated>
   First timeout: 10 seconds
Wearer: A small cup of Americano, please.
Counterpart: Yes, it is 3,000 won for a small cup of Americano. How would you like to pay?
Wearer: Please pay with this.
Counterpart: Yes, payment is done. I will call you as customer No. 6
<Keyword detected and timeout extended>
   Keyword: "Customer No. 6", "Call"
   Second timeout: 30 seconds
   Whether to extend: waiting.
Wearer: Thank you
<First timeout elapsed>
<Voice agent module> (I think you seem to wait for a specific product.) Would you like to extend the conversation mode?
Wearer: Yes
<Set timeout to second timeout>
Counterpart: "Customer No. 6, here is a glass of Americano"
Wearer: Yes, bye
<Conversation Mode Deactivated>
   Timeout: 10 seconds Table 2 shows an example in which the voice agent module 530 inquires of the wearer about whether to extend a timeout as compared to the example in table 1.

Referring to table 2, when the first timeout is elapsed after the utterance ("thank you") of the wearer, the voice agent module 530 may inquire of the wearer about whether to extend the timeout. According to an embodiment, when the wearer asks for the extension of the timeout, the smart conversation mode control module 550 may activate the conversation mode by the second timeout.

Following table 3 shows another example in which the smart conversation mode control module 550 activates and prolongs a conversation mode, depending on the conversation between a counterpart and a wearer.

TABLE 3

<Conversation Mode Deactivated>
   Surrounding situation: Café, lots of people, standing posture, or surrounding device detected.
   Counterpart: May I take your order?
<Conversation Mode Activated>
   First timeout: 10 seconds
Wearer: A small cup of Americano, please.
Counterpart: Yes, it is 3,000 won for a small cup of Americano. How would you like to pay?
Wearer: Please pay with this.
Counterpart: Yes, payment is done. I will call you as customer No. 6
<Keyword detected and timeout extended>
   Keyword: "Customer No. 6," "Call"
   Second timeout: 30 seconds
Wearer: Thank you
Counterpart: "Customer No. 6, here is a glass of Americano"
Wearer: Yes, bye.
<Conversation Mode Deactivated>
   Keyword: "Bye"
   First timeout: 10 seconds The example in table 3 shows that the smart conversation mode control module 550 immediately deactivates the conversation mode when the key word is detected after the conversation mode is activated as compared to the example in table 1.

Referring to table 3, the smart conversation mode control module 550 may immediately deactivate the conversation mode without waiting for the second timeout when the utterance ("Yes, bye") of the wearer, which includes a specific keyword, is sensed.

Figure 12:
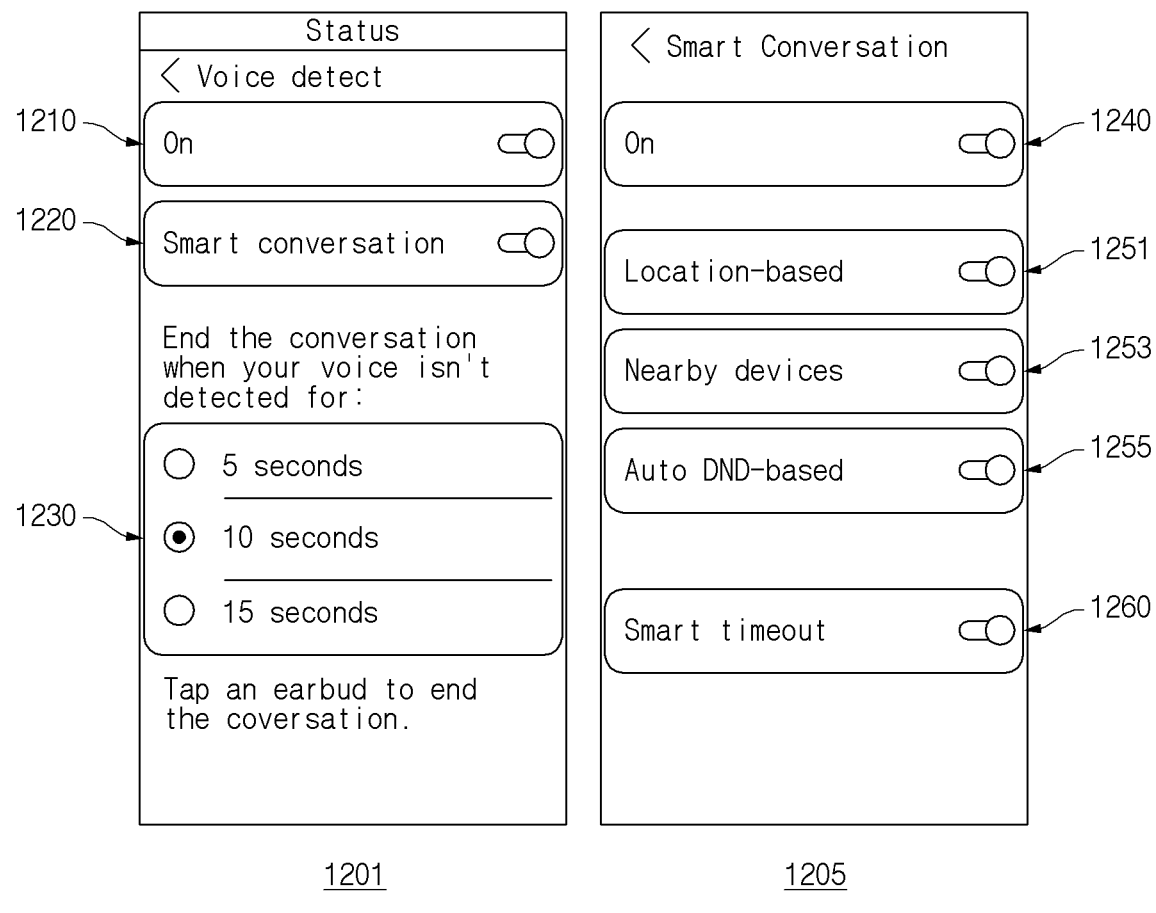
FIG. 12 is a view illustrating a user interface (UI), according to an embodiment of the disclosure.

FIG. 12 is a view illustrating a user interface (UI), according to an embodiment of the disclosure.

The user interface of FIG. 12 may be displayed on the electronic device 201 paired with the wireless audio device 202.

According to an embodiment, a conversation mode control user interface 1201 may include a setting bar 1210 for indicating the status of a voice detect-based conversation mode. According to an embodiment, a user may activate or deactivate the voice detect-based conversation mode in response to an input into the setting bar 1210.

According to an embodiment, the conversation mode control user interface 1201 may include a setting bar 1220 for indicating the status of a smart conversation mode. According to an embodiment, a user may activate or deactivate the smart conversation mode in response to an input into the setting bar 1220.

According to an embodiment, the conversation mode control user interface 1201 may include a user interface 1230 for setting a timeout (a time for ending a conversation mode). According to an embodiment, the timeout may be set by making the input into the user interface 1230. The timeout shown in the conversation mode control user interface 1201 is provided only for the illustrative purpose, and embodiments of the disclosure is not limited thereto.

According to an embodiment, the smart conversation mode control user interface 1205 may be displayed in response to an input into the setting bar 1220.

According to an embodiment, the smart conversation mode control user interface 1205 may include a setting bar 1240 for indicating the status of a smart conversation mode. According to an embodiment, a user may activate or deactivate the smart conversation mode in response to an input into the setting bar 1240.

According to an embodiment, the smart conversation mode control user interface 1205 may include a setting bar 1251 for indicating the status of a location-based smart conversation mode. According to an embodiment, a user may activate or deactivate the location-based smart conversation mode in response to an input into the setting bar 1251. According to an embodiment, the location-based smart conversation mode may be a mode to activate or deactivate the conversation mode based on an output (e.g., a signal for indicating whether a current situation is a situation allowing a conversation, and/or a score for conversation possibility) from the operating environment learning module 563.

According to an embodiment, the smart conversation mode control user interface 1205 may include a setting bar 1253 for indicating the status of a smart conversation mode based on nearby devices. According to an embodiment, a user may activate or deactivate the smart conversation mode based on the nearby devices in response to an input into the setting bar 1253. According to an embodiment, the smart conversation mode based on the nearby devices may be a mode to activate or deactivate the conversation mode, based on an output (that is, a signal for indicating whether a current situation is a situation allowing a conversation, and/or a score for conversation possibility) from the operating environment learning module 562.

According to an embodiment, the smart conversation mode control user interface 1205 may include a setting bar 1255 for indicating the status of a smart conversation mode based on do not disturb (DND). According to an embodiment, a user may activate or deactivate the smart conversation mode based on do not disturb (DND) in response to an input into the setting bar 1255. According to an embodiment, the smart conversation mode based on do not disturb (DND)

may be a mode to activate or deactivate the conversation mode based on an output (e.g., a signal for indicating whether a current situation is a situation allowing a conversation, and/or a score for conversation possibility) from the operating environment learning module 564.

According to an embodiment, the smart conversation mode control user interface 1205 may include a setting bar 1260 for indicating the status of a smart timeout. According to an embodiment, a user may activate or deactivate the smart timeout in response to an input into the setting bar 1260. According to an embodiment, the smart timeout may be a mode to determine whether to extend the timeout based on the keyword detected from the utterance of the wearer and/or the counterpart.

Figure 13:
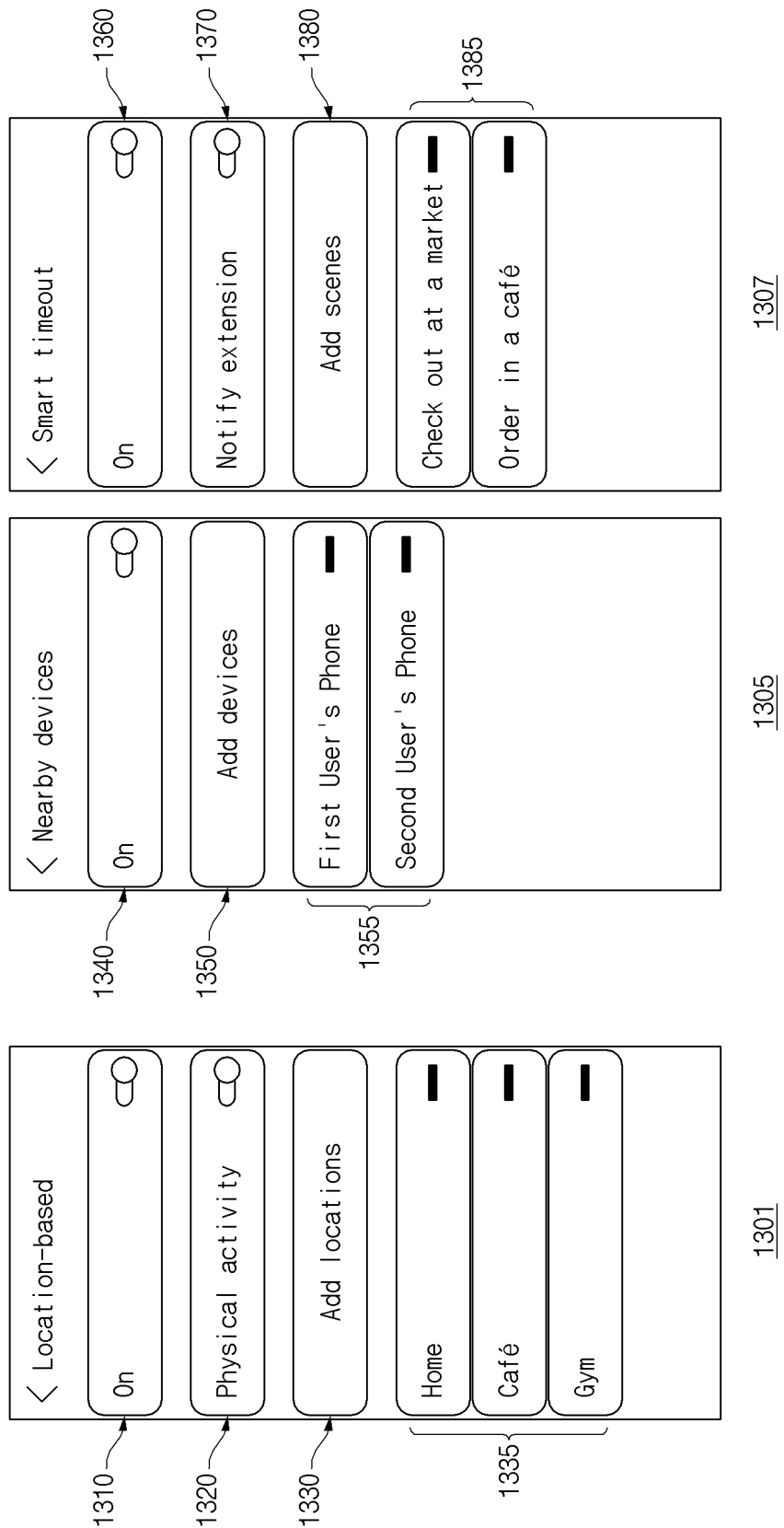
FIG. 13 is a view illustrating a user interface (UI), according to an embodiment of the disclosure.

FIG. 13 is a view illustrating a user interface (UI), according to an embodiment of the disclosure.

The user interface of FIG. 13 may be displayed on the electronic device 201 paired with the wireless audio device 202.

According to an embodiment, a location-based smart conversation mode control user interface 1301 may be displayed in response to an input into the setting bar 1251.

According to an embodiment, the location-based smart conversation mode control user interface 1301 may include a setting bar 1310 for indicating the status of a location-based smart conversation mode. According to an embodiment, a user may activate or deactivate the location-based smart conversation mode in response to an input into the setting bar 1310.

According to an embodiment, the location-based smart conversation mode control user interface 1301 may include a setting bar 1320 for indicating whether information on a posture of the wearer is utilized. According to an embodiment, the user may determine whether to utilize the information on the posture of the wearer based on the input into the setting bar 1320.

According to an embodiment, the location-based smart conversation mode control user interface 1301 may include a setting bar 1330 for adding a location to which the location-based smart conversation mode is applied. According to an embodiment, a user may add the location to which the location-based smart conversation mode is applied in response to an input into the setting bar 1330. According to an embodiment, referring to the location-based smart conversation mode control user interface 1301, a location 1335 added by the user may include a house, a café, a gym, and/or the like, including combinations and/or multiples thereof.

According to an embodiment, a nearby device-based smart conversation mode control user interface 1305 may be displayed in response to an input into the setting bar 1253.

According to an embodiment, the nearby device-based smart conversation mode control user interface 1305 may include a setting bar 1340 for indicating the status of a smart conversation mode based on nearby devices. According to an embodiment, a user may activate or deactivate the nearby device-based smart conversation mode based on the nearby devices in response to an input into the setting bar 1340.

According to an embodiment, the nearby device-based smart conversation mode control user interface 1305 may include a setting bar 1350 for adding a registered device. According to an embodiment, the user may register a device based on the input into the setting bar 1350. According to an embodiment, referring to the nearby device-based smart conversation mode control user interface 1305, a device 1355 added by the user may include a cellular phone ("phone") of a first user and an earbud ("buds") of a second user.

According to an embodiment, a smart timeout control user interface 1307 may be displayed in response to an input into the setting bar 1260.

According to an embodiment, the smart timeout control user interface 1307 may include a setting bar 1360 for indicating the status of a smart timeout. According to an embodiment, a user may activate or deactivate the smart timeout in response to an input into the setting bar 1360.

According to an embodiment, the smart timeout control user interface 1307 may include a setting bar 1370 for indicating whether to query a wearer about an extension of the timeout before the timeout is extended. According to an embodiment, the user may determine whether to notify a wearer of the extension of the timeout, before the timeout is extended, in response to the input into the setting bar 1370.

According to an embodiment, the smart timeout control user interface 1307 may include a setting bar 1380 for adding a scene to which the smart timeout is applied. According to an embodiment, a user may add a scene to which the smart timeout is applied in response to an input into the setting bar 1380. According to an embodiment, referring to the smart timeout control user interface 1307, a scene 1385 added by the user may include a check-out situation in a market, an ordering situation in a café, and/or the like, including combinations and/or multiples thereof.

Figure 14:
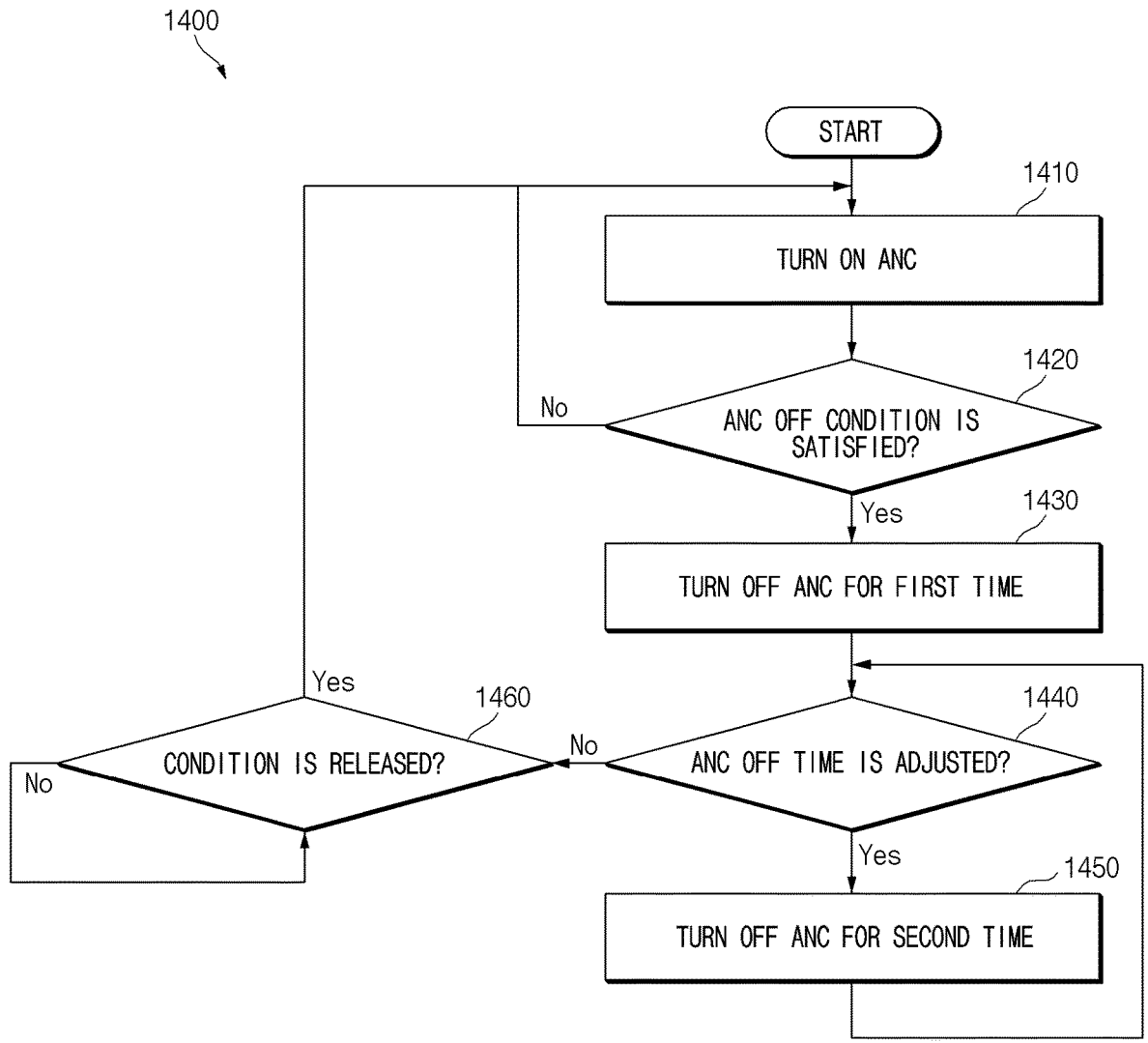
FIG. 14 is a flowchart illustrating a method of operation of a wireless audio device, according to an embodiment of the disclosure.

FIG. 14 is a flowchart illustrating a method 1400 of operation of the wireless audio device 202, according to an embodiment of the disclosure.

The operations illustrated in FIG. 14 may be performed through components of the wireless audio device 202.

In operation 1410, the wireless audio device 202 may turn on ANC. According to an embodiment, the wireless audio device 202 may deactivate ANC.

According to another embodiment, the wireless audio device 202 may deactivate the listening to the ambient sound.

In operation 1420, the wireless audio device 202 may identify whether an ANC off condition is satisfied.

According to an embodiment, the wireless audio device 202 may identify whether the ANC off condition is satisfied based on information on the conversation situation and/or information on the conversation possibility.

For example, the wireless audio device 202 may identify that the ANC off condition is satisfied responsive to the current situation being identified as the conversation situation and responsive to the conversation possibility being identified as being present. For example, the wireless audio device 202 may identify that the ANC off condition is satisfied responsive to a score for the conversation situation exceeding a reference score, and responsive to the score for the conversation possibility exceeding the reference score.

According to an embodiment, when the ANC off condition is satisfied ("determined as "Yes"), the wireless audio device 202 may perform operation 1430. According to an embodiment, when the ANC off condition is not satisfied ("determined as "No"), the wireless audio device 202 may perform operation 1410.

In operation 1430, the wireless audio device 202 may turn off ANC for a first time. According to an embodiment, the first time may be the first timeout which is previously set.

In operation 1440, the wireless audio device 202 may identify whether adjustment of a time point at which the ANC is turned off is desired.

According to an embodiment, the wireless audio device 202 may identify that the adjustment of the time point at which the ANC is turned off is desired responsive to a specified keyword being detected from an utterance of the wearer and/or an utterance of the outsider.

According to an embodiment, when the adjustment of the time point at which the ANC is turned off is desired ("determined as "Yes"), the wireless audio device 202 may perform operation 1450. According to an embodiment, responsive to the adjustment of the time point, at which the ANC is turned off, is not desired ("determined as "No"), the wireless audio device 202 may perform operation 1460.

In operation 1450, the wireless audio device 202 may turn off ANC for a second time. According to an embodiment, the second time may be a second timeout. According to an embodiment, the second time may be set based on a keyword detected from the utterance of the wearer and/or the utterance of the outsider.

In operation 1460, the wireless audio device 202 may identify whether the condition is released.

According to an embodiment, the wireless audio device 202 may identify that the condition is released responsive to the arrival of the time point at which the ANC is turned off. According to an embodiment, the wireless audio device 202 may identify that the condition is released responsive to identifying a wearer utterance requesting turning on the ANC.

According to an embodiment, responsive to the condition being released ("determined as "Yes"), the wireless audio device 202 may perform operation 1410. According to an embodiment, responsive to the condition not being released ("determined as "No"), the wireless audio device 202 may perform operation 1460. According to another embodiment, responsive to the condition not being released ("determined as "No"), the wireless audio device 202 may perform operation 1440.

Figure 15:
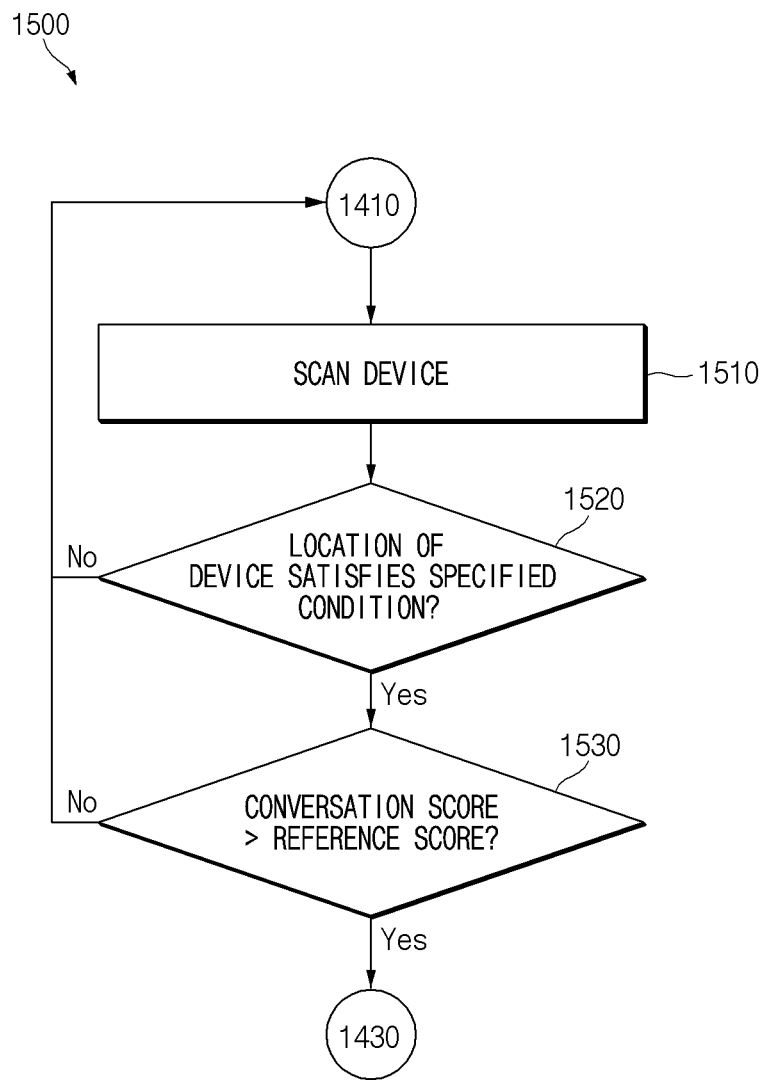
FIG. 15 is a flowchart illustrating a method of determining whether an AMC off condition of a wireless audio device is satisfied, according to an embodiment of the disclosure.

FIG. 15 is a flowchart illustrating a method 1500 of determining whether the AMC off condition of the wireless audio device 202 is satisfied, according to an embodiment of the disclosure.

The operations of FIG. 15 may be included in operation 1420 of FIG. 14. The operations illustrated in FIG. 15 may be performed through components of the wireless audio device 202.

In operation 1510, the wireless audio device 202 may scan a device. According to an embodiment, the wireless audio device 202 may scan a device within a specified distance based on a sensor signal from the sensor circuit 503.

According to an embodiment, the wireless audio device 202 may identify whether the scanned device is a device registered in the wireless audio device 202.

In operation 1520, the wireless audio device 202 may identify whether the location of the device satisfies a specified condition.

According to an embodiment, the wireless audio device 202 may identify the specified condition as being satisfied responsive to the identified device staying within a specified distance for a specified time or more.

According to an embodiment, the wireless audio device 202 may identify the specified condition as being satisfied responsive to the identified device being a registered device and staying within the first distance for the first time. According to an embodiment, the wireless audio device 202 may identify the specified condition as being satisfied responsive to the identified device not being the registered device and staying within the second distance for the second time or more. For example, the first distance may be longer than the second distance. For example, the first time may be shorter than the second time. For another example, the first time may be equal to the second time.

According to an embodiment, responsive to the specified condition being identified as being satisfied (determined as "Yes"), the wireless audio device 202 may perform operation 1530. According to an embodiment, responsive to the specified condition not being identified as being satisfied (determined as "No"), the wireless audio device 202 may perform operation 1410.

In operation 1530, the wireless audio device 202 may identify whether a conversation score exceeds a reference score. According to an embodiment, the wireless audio device 202 may identify whether a conversation score, which is calculated based on the distance to the identified device and/or the stay time of the identified device, exceeds a reference score.

According to an embodiment, responsive to the conversation score exceeding the reference score ("determined as "Yes"), the wireless audio device 202 may perform operation 1430. According to an embodiment, responsive to the conversation score not exceeding the reference score ("determined as "No"), the wireless audio device 202 may perform operation 1410.

Figure 16:
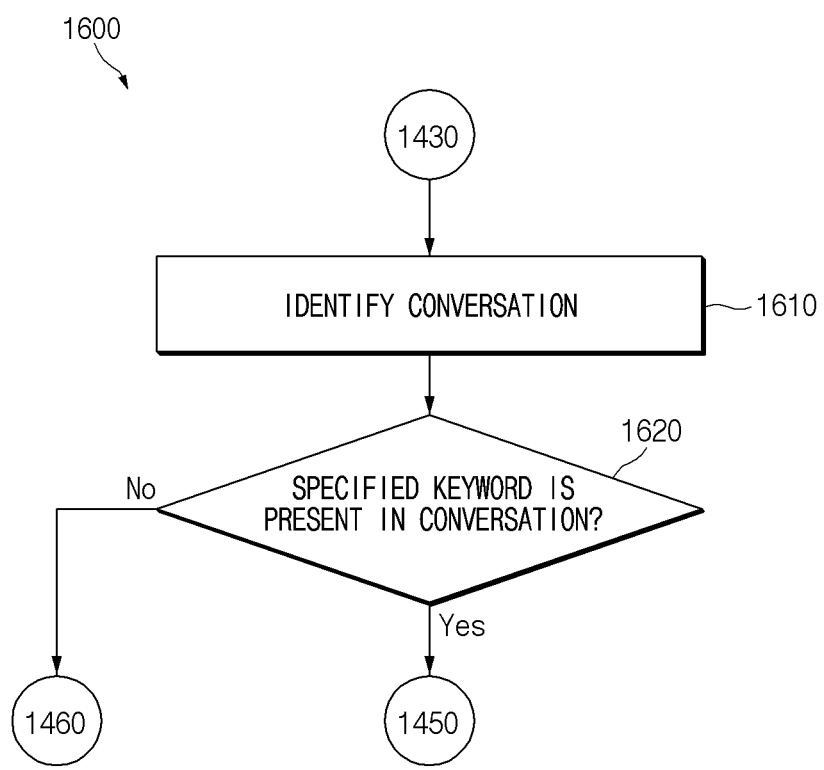
FIG. 16 is a flowchart illustrating a method of determining, by a wireless audio device, the adjustment of a time point, at which AMC is turned off, according to an embodiment of the disclosure.

FIG. 16 is a flowchart illustrating a method 1600 of determining, by the wireless audio device 202, the adjustment of the time point at which the AMC is turned off, according to an embodiment of the disclosure.

The operations of FIG. 16 may be included in operation 1440 of FIG. 14. The operations illustrated in FIG. 16 may be performed through components of the wireless audio device 202.

In operation 1610, the wireless audio device 202 may identify a conversation. According to an embodiment, the wireless audio device 202 may identify the utterance of the wearer and/or the utterance of the counterpart.

In operation 1620, the wireless audio device 202 may identify whether a specified keyword is present in the identified conversation.

According to an embodiment, the wireless audio device 202 may determine whether a keyword candidate is identified from the utterance of the wearer and/or the utterance of the counterpart. According to an embodiment, the keyword candidate may be a keyword corresponding to an environment in which the wireless audio device 202 is positioned. According to an embodiment, the keyword candidate may be determined based on a location, a place, a scene, and/or the like, including combinations and/or multiples thereof in which the wireless audio device 202 is located, or the combination thereof.

According to an embodiment, responsive to the specified keyword being included in the identified conversation (determined as "Yes"), the wireless audio device 202 may perform operation 1450. According to an embodiment, responsive to the specified keyword not being included in the identified conversation (determined as "No"), the wireless audio device 202 may perform operation 1460.

According to an embodiment of the disclosure, a wireless audio device 202 may include a speaker (e.g., an audio output circuit 471 or 472), a sensor (e.g., a sensor circuit 451 or 452), a communication circuit 491 or 492, a processor 421 or 422, and a memory 431 or 432 to store instructions. The instructions may, when executed by the processor 421 or 422, identify, using the communication circuit 491 or 492, an external electronic device while outputting a signal for reducing an external sound through the speaker, identify, using the sensor, a conversation responsive to a location of the external electronic device satisfying a specified condition, responsive to identifying the conversation, stop an output of the signal for reducing the external sound for a first period of time, and responsive to identifying a specified keyword included in the conversation, prolong stopping the output of the signal for reducing the external sound for a second period of time.

According to an embodiment, the instructions, when executed by the processor 421 or 422, cause the wireless audio device 202 to identify, using the sensor, the conversation responsive to the location of the external electronic device being positioned within a specified distance for a specified time.

According to an embodiment, the instructions may be configured to, when executed by the processor 421 or 422, cause the wireless audio device 202 to identify whether the external electronic device is a registered external electronic device, responsive to identifying that the external electronic device is a registered external electronic device, identify, using the sensor, the conversation responsive to the location of the at least one external electronic device being positioned within a first distance for the first period of time, and responsive to identifying that the external electronic device is not a registered external electronic device, identify, using the sensor, the conversation responsive to the location being positioned within a second distance for the second period of time. wherein the first period of time is shorter than the second period of time. The first distance is longer than the second distance.

According to an embodiment, the instructions may be configured to, when executed by the processor 421 or 422, cause the wireless audio device 202 to receive information on a location of the wireless audio device through the at least one sensor, identify information on a place in which the wireless audio device is located based on the information on the location of the wireless audio device, identify a probability of the conversation in the place indicated through the information on the place, and identify, using the sensor, the conversation responsive to the probability of the conversation exceeding a reference probability.

According to an embodiment, a microphone (e.g., an audio receive circuit 481 or 482) may be further included. The memory may store a plurality of scene models corresponding to a plurality of places. The instructions may be configured to, when executed by the processor 421 or 422, cause the wireless audio device 202 to receive an audio signal through the microphone, identify a similarity between the audio signal and a scene model, which corresponds to the place, of the plurality of scene models, adjust the probability of the conversation based on the similarity, and identify, using the sensor, the conversation responsive to the adjusted probability of the conversation exceeding the reference probability.

According to an embodiment, the instructions may be configured to, when executed by the processor 421 or 422, cause the wireless audio device 202 to receive, via the sensor, information on a posture of a user of the wireless audio device, and identify, based on the information on the posture of the user, the probability of the conversation in the place indicated by the information on the place.

According to an embodiment, the instructions may be configured to, when executed by the processor 421 or 422, cause the wireless audio device 202 to identify information on a context, identify, based on the information on the context a probability of the conversation, and responsive to the probability of the conversation exceeding a reference probability, identify, using the sensor, the conversation. The information on the context includes at least one of a type of content that is being reproduced, a type of an application that is being executed, a type of a user input that is being input, or a type of a current schedule.

According to an embodiment, the instructions may be configured to, when executed by the processor 421 or 422, cause the wireless audio device 202 to responsive to identifying the specified keyword included in the conversation, output a message for making an inquiry about prolonging stopping the output of the signal while stopping the output of the signal for the first period of time, and responsive to an input of a request to prolong stopping the output of the signal, prolong stopping the output of the signal for the second period of time.

According to an embodiment, the specified keyword may be keywords previously set for the place in which the wireless audio device 202 is located.

According to an embodiment, the instructions may be configured to, when executed by the processor 421 or 422, cause the wireless audio device 202 to prolong stopping the output of the signal by a period of time set for the type of the specified keyword included in the identified conversation.

According to an embodiment of the disclosure, a method for operating a wireless audio device 202, the method includes, while outputting a signal for reducing an external sound through at least one speaker (e.g., an audio output circuit 471 or 472) of the wireless audio device 202, identifying, using a communication circuit 491 or 492 of the wireless audio device 202 an external electronic device, identifying, using a sensor (e.g., a sensor circuit 451 or 452), a conversation responsive to a location of the external electronic device satisfying a specified condition, responsive to identifying the conversation, stopping an output of the signal for reducing the external sound for a first period of time, and responsive to identifying a specified keyword included in the conversation, prolonging stopping the output of the signal for reducing the external sound for a second period of time.

According to an embodiment, the identifying of the conversation may include identifying, using the sensor, the conversation responsive to the location of the external electronic device being positioned within a specified distance for a specified time.

According to an embodiment, the identifying of the at least one external electronic may include identifying whether the external electronic device is a registered external electronic device. The identifying of the conversation may include responsive to identifying that the external electronic device is a registered external electronic device, identifying, using the sensor, the conversation responsive to the location being positioned within a first distance for the first period of time, and responsive to identifying that the external electronic device is not a registered external electronic device, identifying, using the sensor, the conversation responsive to the location being positioned within a second distance for the second period of time. The first period of time may be shorter than the second period of time, and the first distance may be longer than the second distance.

According to an embodiment of the disclosure, the method for operating the wireless audio device 202 may include receiving information on a location of the wireless audio device through the at least one sensor, identifying information on a place in which the wireless audio device is located, based on the information on the location of the wireless audio device, identifying a probability of the conversation in the place indicated through the information on the place, and identifying, using the sensor, the conversation responsive to the probability of the conversation exceeding a reference probability.

According to an embodiment of the disclosure, the method for operating the wireless audio device 202 may include receiving an audio signal through a microphone (e.g., the audio receive circuit 481 or 482) of the wireless audio device, identifying a similarity between the audio signal and a scene model, which corresponds to the place, of the plurality of scene models, adjusting the probability of the conversation probability based on the similarity, and identifying, using the sensor, the conversation responsive to the adjusted probability of the conversation exceeding a reference probability.

According to an embodiment of the disclosure, the method for operating the wireless audio device 202 may include receiving, via the sensor, information on a posture of a user of the wireless audio device, and identifying, based on the information on the posture of the user, the probability of the conversation in the place indicated by the information on the place.

According to an embodiment of the disclosure, the method for operating the wireless audio device 202 may include identifying information on a context, identifying, based on the information on the context, the probability of the conversation, and responsive to the probability of the conversation exceeding a reference probability, identifying, using the sensor, the conversation. The information of the context may include at least one of a type of content that is being reproduced, a type of an application that is being executed, a type of a user input which is being input, or a type of a current schedule.

According to an embodiment of the disclosure, the method for operating the wireless audio device 202 may include responsive to identifying the specified keyword included in the conversation, outputting a message for making an inquiry about prolonging stopping the output of the signal while stopping the output of the signal for the first period of time, and responsive to an input of a request to prolong stopping the output of the signal, prolonging stopping the output of the signal for the second period of time.

According to an embodiment of the disclosure, in the method for operating the wireless audio device 202, the specified keyword may include keywords previously set for the place in which the wireless audio device is located.

According to an embodiment of the disclosure, the method for operating the wireless audio device 202 may include prolonging stopping the output of the signal by a period of time set for a type of the specified keyword included in the identified conversation.

According to an embodiment of the disclosure, a method includes enabling an active noise cancellation function for a wireless audio device 202, determining whether an active noise cancellation function off condition is satisfied, responsive to determining that the active noise cancellation function off condition is satisfied, disabling the active noise cancellation function for a first period of time, determining whether to adjust the first period of time responsive to keyword being detected from an utterance, and responsive to determining to adjust the first period of time, continuing to disable the active noise cancellation function for a second period of time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wireless audio device comprising:
a speaker;
a sensor;
a communication circuit;
a processor; and
a memory configured to store instructions,
wherein the instructions, when executed by the processor, cause the wireless audio device to, while outputting a signal for reducing an external sound through the speaker:
identify, using the communication circuit, an external electronic device;
identify, using the sensor, a conversation responsive to a location of the least one external electronic device satisfying a specified condition;
responsive to identifying the conversation, stop an output of the signal for reducing the external sound for a first period of time; and
responsive to identifying a specified keyword included in the conversation, prolong stopping the output of the signal for reducing the external sound for a second period of time.

2. The wireless audio device of claim 1, wherein the instructions, when executed by the processor, cause the wireless audio device to:
identify, using the sensor, the conversation responsive to the location of the external electronic device being positioned within a specified distance for a specified time.

3. The wireless audio device of claim 2, wherein the instructions, when executed by the processor, cause the wireless audio device to:
identify whether the external electronic device is a registered external electronic device;
responsive to identifying that the external electronic device is a registered external electronic device, identify, using the sensor, the conversation responsive to the location of the at least one external electronic device being positioned within a first distance for the first period of time; and responsive to identifying that the external electronic device is not a registered external electronic device, identify, using the sensor, the conversation responsive to the location being positioned within a second distance for the second period of time,
wherein the first period of time is shorter than the second period of time, and
wherein the first distance is longer than the second distance.

4. The wireless audio device of claim 1, wherein the instructions, when executed by the processor, cause the wireless audio device to:
receive information on a location of the wireless audio device using the sensor;
identify information on a place in which the wireless audio device is located based on the information on the location of the wireless audio device;
identify a probability of the conversation in the place indicated through the information on the place; and
identify, using the sensor, the conversation responsive to the probability of the conversation exceeding a reference probability.

5. The wireless audio device of claim 4, further comprising:
a microphone,
wherein the memory stores a plurality of scene models corresponding to a plurality of places, and
wherein the instructions, when executed by the processor, cause the wireless audio device to:
receive an audio signal through the microphone;
identify a similarity between the audio signal and a scene model, which corresponds to the place, of the plurality of scene models;
adjust the probability of the conversation probability based on the similarity; and
identify, using the sensor, the conversation responsive to the adjusted probability of the conversation exceeding a reference probability.

6. The wireless audio device of claim 4, wherein the instructions, when executed by the processor, cause the wireless audio device to:
receive, via the sensor, information on a posture of a user of the wireless audio device; and
identify, based on the information on the posture of the user, the probability of the conversation in the place indicated by the information on the place.

7. The wireless audio device of claim 1, wherein the instructions, when executed by the processor, cause the wireless audio device to:
identify information on a context;
identify, based on the information on the context a probability of the conversation; and
responsive to the probability of the conversation exceeding a reference probability, identify, using the sensor, the conversation, and
wherein the information on the context includes at least one of a type of content that is being reproduced, a type of an application that is being executed, a type of a user input that is being input, or a type of a current schedule.

8. The wireless audio device of claim 1, wherein the instructions, when executed by the processor, cause the wireless audio device to:
responsive to identifying the specified keyword included in the conversation, output a message for making an inquiry about prolonging stopping the output of the signal while stopping the output of the signal for the first period of time; and responsive to an input of a request to prolong stopping the output of the signal, prolong stopping the output of the signal for the second period of time.

9. The wireless audio device of claim 1, wherein the specified keyword includes keywords previously set for the place in which the wireless audio device is located.

10. The wireless audio device of claim 1, wherein the instructions, when executed by the processor, cause the wireless audio device to:
prolong stopping the output of the signal by a period of time set for a type of the specified keyword included in the identified conversation.

11. A method for operating a wireless audio device, the method comprising, while outputting a signal for reducing an external sound through a speaker of the wireless audio device:
identifying, using a communication circuit of the wireless audio device, an external electronic device;
identifying, using a sensor of the wireless audio device, a conversation responsive to a location of the at least one external electronic device satisfying a specified condition;
responsive to identifying the conversation, stopping an output of the signal for reducing the external sound for a first period of time; and
responsive to identifying a specified keyword included in the conversation, prolonging stopping the output of the signal for reducing the external sound for a second period of time.

12. The method of claim 11, wherein the identifying of the conversation includes:
identifying, using the sensor, the conversation responsive to the location of the external electronic device being positioned within a specified distance for a specified time.

13. The method of claim 12, wherein the identifying of the at least one external electronic includes:
identifying whether the external electronic device is a registered external electronic device,
wherein the identifying of the conversation includes:
responsive to identifying that the external electronic device is a registered external electronic device, identifying, using the sensor, the conversation responsive to the location being positioned within a first distance for the first period of time; and
responsive to identifying that the external electronic device is not a registered external electronic device, identifying, using the sensor, the conversation responsive to the location being positioned within a second distance for the second period of time,
wherein the first period of time is shorter than the second period of time, and
wherein the first distance is longer than the second distance.

14. The method of claim 11, further comprising:
receiving information on a location of the wireless audio device using the sensor;
identifying information on a place in which the wireless audio device is located, based on the information on the location of the wireless audio device;
identifying a probability of the conversation in the place indicated through the information on the place; and
identifying, using the sensor, the conversation responsive to the probability of the conversation exceeding a reference probability.

15. The method of claim 14, comprising:
receiving an audio signal through a microphone of the wireless audio device;
identifying a similarity between the audio signal and a scene model, which corresponds to the place, of the plurality of scene models;
adjusting the probability of the conversation probability based on the similarity; and
identifying, using the sensor, the conversation responsive to the adjusted probability of the conversation exceeding a reference probability.

16. The method of claim 14, comprising:
receiving, via the sensor, information on a posture of a user of the wireless audio device; and
identifying, based on the information on the posture of the user, the probability of the conversation in the place indicated by the information on the place.

17. The method of claim 11, comprising:
identifying information on a context;
identifying, based on the information on the context, the probability of the conversation; and
responsive to the probability of the conversation exceeding a reference probability, identifying, using the sensor, the conversation,
wherein the information of the context includes at least one of a type of content that is being reproduced, a type of an application that is being executed, a type of a user input which is being input, or a type of a current schedule.

18. The method of claim 11, further comprising
responsive to identifying the specified keyword included in the conversation, outputting a message for making an inquiry about prolonging stopping the output of the signal while stopping the output of the signal for the first period of time, and
responsive to an input of a request to prolong stopping the output of the signal, prolonging stopping the output of the signal for the second period of time.

19. The method of claim 11, wherein the specified keyword includes keywords previously set for the place in which the wireless audio device is located.

20. A method comprising:
enabling an active noise cancellation function for a wireless audio device;
determining whether an active noise cancellation function off condition is satisfied;
responsive to determining that the active noise cancellation function off condition is satisfied, disabling the active noise cancellation function for a first period of time;
determining whether to adjust the first period of time responsive to keyword being detected from an utterance; and
responsive to determining to adjust the first period of time, continuing to disable the active noise cancellation function for a second period of time.

\* \* \* \* \*